United States Patent
Hodjat et al.

(10) Patent No.: US 9,710,764 B1
(45) Date of Patent: Jul. 18, 2017

(54) DATA MINING TECHNIQUE WITH POSITION LABELING

(71) Applicant: SENTIENT TECHNOLOGIES (BARBADOS) LIMITED, Belleville (BB)

(72) Inventors: Babak Hodjat, Dublin, CA (US); Hormoz Shahrzad, Dublin, CA (US); Kaivan Kamali, State College, PA (US); Daniel E. Fink, Berkeley, CA (US)

(73) Assignee: SENTIENT TECHNOLOGIES (BARBADOS) LIMITED, Belleville (BB)

( * ) Notice: Subject to any disclaimer, the term of this patent is extended or adjusted under 35 U.S.C. 154(b) by 486 days.

(21) Appl. No.: 14/209,933

(22) Filed: Mar. 13, 2014

Related U.S. Application Data

(60) Provisional application No. 61/789,387, filed on Mar. 15, 2013.

(51) Int. Cl.
*G06N 99/00* (2010.01)

(52) U.S. Cl.
CPC ................... *G06N 99/005* (2013.01)

(58) Field of Classification Search
None
See application file for complete search history.

(56) References Cited

U.S. PATENT DOCUMENTS

| | | |
|---|---|---|
| 5,845,266 A | 12/1998 | Lupien et al. |
| 5,920,848 A | 7/1999 | Schutzer et al. |
| 6,240,399 B1 | 5/2001 | Frank et al. |
| 6,249,783 B1 | 6/2001 | Crone et al. |
| 7,013,344 B2 | 3/2006 | Megiddo |

(Continued)

FOREIGN PATENT DOCUMENTS

| | | |
|---|---|---|
| EP | 2422276 A1 | 2/2012 |
| EP | 2422278 A1 | 2/2012 |

(Continued)

OTHER PUBLICATIONS

Freitas, A. "A review of evolutionary algorithms for data mining." Soft Computing for Knowledge Discovery and Data Mining. Springer US, 2008. 79-111.*

(Continued)

*Primary Examiner* — Kakali Chaki
*Assistant Examiner* — Eric Nilsson
(74) *Attorney, Agent, or Firm* — Haynes Beffel & Wolfeld LLP

(57) ABSTRACT

Roughly described, individuals in both a training system and in a production system include a label field in their rule outputs. Positions entered by an individual are maintained in a status record for the individual, including the label output by the rule which triggered entry of that position. Rules that assert exiting or partial exiting of a position also output the label from the rule which triggered the assertion, and are effective only so far as matching positions exist or remain in the individual's status record, including a matching label. Labels present in the status record also can be referenced in conditions of a rule. During evolution, a rule's output label is subject to crossover and/or mutation just like the conditions and output assertions.

47 Claims, 13 Drawing Sheets

(56) References Cited

U.S. PATENT DOCUMENTS

| | | | |
|---|---|---|---|
| 7,370,013 | B1 | 5/2008 | Aziz et al. |
| 7,444,309 | B2 | 10/2008 | Branke et al. |
| 8,527,433 | B2 | 9/2013 | Hodjat et al. |
| 8,768,811 | B2 | 7/2014 | Hodjat et al. |
| 8,825,560 | B2 | 9/2014 | Hodjat et al. |
| 8,909,570 | B1 | 12/2014 | Hodjat et al. |
| 8,918,349 | B2 | 12/2014 | Hodjat et al. |
| 2002/0019844 | A1 | 2/2002 | Kurowski et al. |
| 2004/0210545 | A1 | 10/2004 | Branke et al. |
| 2004/0254901 | A1 | 12/2004 | Bonabeau et al. |
| 2005/0033672 | A1 | 2/2005 | Lasry et al. |
| 2005/0187848 | A1 | 8/2005 | Bonissone et al. |
| 2005/0198103 | A1 | 9/2005 | Ching |
| 2007/0112824 | A1* | 5/2007 | Lock ............... G06N 5/025 |
| 2007/0143198 | A1 | 6/2007 | Brandes et al. |
| 2007/0143759 | A1 | 6/2007 | Ozgur et al. |
| 2007/0185990 | A1 | 8/2007 | Ono et al. |
| 2008/0071588 | A1 | 3/2008 | Eder |
| 2008/0228644 | A1 | 9/2008 | Birkestrand et al. |
| 2009/0125370 | A1 | 5/2009 | Blondeau et al. |
| 2009/0307638 | A1 | 12/2009 | McConaghy |
| 2010/0030720 | A1 | 2/2010 | Stephens |
| 2010/0182935 | A1 | 7/2010 | David |
| 2010/0274736 | A1* | 10/2010 | Hodjat ............... G06N 3/126 705/36 R |
| 2010/0274742 | A1 | 10/2010 | Hodjat et al. |
| 2010/0293119 | A1 | 11/2010 | Ferringer et al. |
| 2011/0161264 | A1 | 6/2011 | Cantin |
| 2011/0202639 | A1* | 8/2011 | Suzuki ............... G06N 3/126 709/220 |
| 2012/0239517 | A1 | 9/2012 | Blondeau et al. |
| 2013/0124440 | A1 | 5/2013 | Hodjat et al. |
| 2013/0254142 | A1 | 9/2013 | Hodjat et al. |
| 2014/0006316 | A1 | 1/2014 | Hodjat et al. |
| 2014/0229362 | A1 | 8/2014 | Hodjat et al. |

FOREIGN PATENT DOCUMENTS

| | | | |
|---|---|---|---|
| JP | 08-110804 | A | 4/1996 |
| JP | 2001325041 | A | 11/2001 |
| JP | 2003044665 | A | 2/2003 |
| JP | 2004240671 | A | 8/2004 |
| JP | 2004302741 | A | 10/2004 |
| JP | 2007207173 | A | 8/2007 |
| JP | 2007522547 | A | 8/2007 |
| WO | 2005073854 | A2 | 8/2005 |
| WO | 2010127039 | A1 | 11/2010 |
| WO | 2010127042 | A1 | 11/2010 |

OTHER PUBLICATIONS

Schoreels, C. "Agent based genetic algorithm employing financial technical analysis for making trading decisions using historical equity market data." Intelligent Agent Technology, 2004.(IAT 2004). Proceedings. IEEE/WIC/ACM International Conference on. IEEE, 2004.*

Hornby, G.S., "ALPS: The Age-Layered Population Structure for Reducing the Problem of Premature Convergence," GECCO'06, Seattle, Jul. 2006, authored by an employee of the US Government, therefore in the public domain, 8pp.

Hornby, G.S., "A Steady-State Version of the Age-Layered Population Structure EA," Chapter 1 of Genetic Programming Theory and Practice VII, Riolo et al., editors, Springer 2009, 16pp.

Hornby, G.S., "Steady-State ALPS for Real-Valued Problems," GECCO'09, Montreal, Jul. 2009, Assoc. for Computing Machinery, 8pp.

Idesign lab, "ALPS—the Age-Layered Population Structure," UC Santa Cruz web article printed Mar. 17, 2011, 3 pp. (http://idesign.ucsc.edu/projects/alps.html).

U.S. Appl. No. 13/184,307—Office Action dated Mar. 21, 2014, 36 pages.

Laumanns, Marco et al.; "A Unified Model for Multi-Objective Evolutionary Aigorithms with Elitism"; 2000; IEEE; pp. 46-53.

Ahn, Chang Wook et al.; "Elitism-Based Compact Genetic Algorithms"; 2003; IEEE; Transactions on Evolutionary Computation, vol. 7, No. 4; pp. 367-385.

Gaspar-Cunha, A. et al., "A Multi-Objective Evolutionary Algorithm Using Neural Networks to Approximate Fitness Evaluations," Int'l J. Computers, Systems and Signals, 6(1) 2005, pp. 18-36.

Kosorukoff, A. "Using incremental evaluation and adaptive choice of operators in a genetic algorithm," Proc. Genetic and Evolutionary Computation Conference, GECCO—Sep. 2002, 7pp.

Nelson, A. "Fitness functions in evolutionary robotics: A survey and analysis," Robotics and Autonomous Systems 57 (Apr. 30, 2009) 345-370.

Bongard, J. C. et al., "Guarding Against Premature Convergence while Accelerating Evolutionary Search", GECCO'10: Proceedings of the 12th annual conference on Genetic and Evolutionary Computation, 8 pages. (2010).

Wu, A.S. et al., "An incremental fitness function for partitioning parallel taks," Proc. Genetic and Evolutionary Computation Conf. (Aug. 2001) 8pp.

Whitehead, B.A. "Genetic Evolution of Radial Basis Function Coverage Using Orthogonal Niches," IEEE Transactions on Neural Networks, 7:6, (Nov. 1996) 1525-28.

Bui L.T. et al., "Local models: An approach to distributed multi-objective optimization," Computational Optimization and Applications, vol. 42, No. 1, Oct. 2007, pp. 105-139.

Castillo Tapia M.G. et al., "Applications of multi-objective evolutionary algorithms in economics and finance: A survey," Proc. IEEE Congress on Evolutionary Computation, Sep. 2007, pp. 532-539.

Ducheyne, E. et al., "Is Fitness Inheritance Useful for Real-World Applications?" Evolutionary Multi-Criterion Optimization, ser. LNCS 2631, Spring 2003, pp. 31-42.

Enee, Gilles et al., "Classifier Systems Evolving Multi-Agent System with Distributed Elitism," Proc. 1999 Congress on Evolutionary Computation (CEC'99) vol. 3:6, Jul. 1999, pp. 1740-1746.

Gopalakrishnan, G. et al., "Optimal Sampling in a Noisy Genetic Algorithm for Risk-Based Remediation Design," Bridging the gap: meeting the world's water and environmental resources challenges, Proc. World Water Congress 2001, 8 pp.

Juille, H. "Evolution of Non-Deterministic Incremental Algorithms as a New Approach for Search in State Spaces," Proc. 6th Int'l Conf. on Genetic Algorithms, 1995, 8pp.

International Search Report mailed Jul. 2, 2010 in PCT/US10/32847.

International Search Report mailed Jun. 29, 2010 in PCT/US10/32841.

Sacks, J. et al. "Design and Analysis of Computer Experiments," Statistical Science 4:4, 1989, 409-435.

Torresen, J. "A Dynamic Fitness Function Applied to Improve the Generalisation when Evolving a Signal Processing Hardware Architecture," Proc. EvoWorkshops 2002, 267-299 (12 pp).

Bartlett II, J.E. et al., "Organizational Research: Determining Appropriate Sample Size in Survey Research," IT, Learning, and Performance Journal 19(1) Spring 2001, 8pp.

Fitzpatrick, J.M. et al., "Genetic Algorithms in Noisy Environments," Machine Learning 3: 101-120, May 1988.

JP 2010-533295, Office Action dated Apr. 16, 2013, 12 pages.

Koza, J.R., "Genetic Programming: On the Programming of Computers by Means of Natural Selection", Dec. 1992, MIT Press, pp. 1-609.

León C. et al., "Parallel hypervolume-guided hyperheuristic for adapting the multi-objective evolutionary island model," Proc. 3rd Int'l Workshop on Nature Inspired Cooperative Strategies for Optimization Studies in Computational Intelligence, vol. 236, Nov. 2008, pp. 261-272.

López Jaimes A. et al., "MRMOGA: Parallel evolutionary multiobjective optimization using multiple resolutions," Proc. IEEE Congress on Evolutionary Computation, vol. 3, Sep. 2005, pp. 2294-2301.

Davarynejad, M. et al., "A Novel General Framework for Evolutionary Optimization: Adaptive Fuzzy Fitness Granulation," CEC Sep. 2007, 6pp.

(56) References Cited

OTHER PUBLICATIONS

Davarynejad, M. "Fuzzy Fitness Granulation in Evolutionary Algorithms for complex optimization," Master of Science Thesis, Ferdowsi Univ. of Mashhad, Jun. 2007, 30pp.

Salami, M. et al., "A fast evaluation strategy for evolutionary algorithms," Applied Soft Computing 2/3F (Jan. 2003) 156-173.

M.-R Akbarzadeh-T. et al., "Friendship Modeling for Cooperative Co-Evolutionary Fuzzy Systems: A Hybrid GA-GP Algorithm," Proc. 22nd Int'l Conf. of N. American FIPS, Jul. 2003, pp. 61-66.

Mouret, J.B. et al., "Encouraging Behavioral Diversity in Evolutionary Robotics: An Empirical Study," MIT, Evolutionary Computation 20(1):91-133, 2012.

Myers, Raymond H. and Montgomery, Douglas C., Response Surface Methodology: Process and Product Optimization Using Designed Experiments, John Wiley and Sons, Inc., New York, 1995.

Poli R et al., "Genetic Programmig: An introductory Tutorial and a Survey of Techniques and Applications," Univ. Essex School of Computer Science and Eletronic Engineering Technical Report No. CES-475, Oct. 2007, 112 pp.

Georgilakis, P.S. "Genetic Algorithm Model for Profit Maximization of Generating Companies in Deregulated Electricity Markets," Applied Artificial Intelligence, Jul. 2009, 23:6,538-552.

Refaeilzadeh, P. et al., "Cross Validation" entry, Encyclopedia of Database Systems, eds. Özsu and Liu, Springer, 2009, 6pp.

Remde, S. et al. "Evolution of Fitness Functions to Improve Heuristic Performance," LION Dec. 8-10, 2007 II, LNCS 5313 pp. 206-219.

Sakauchi et al., UNIFINE: A Next Generation Financial Solution System of Nihon Unisys Ltd., Technology Review 'UNISYS,' Japan, Nihon Unisys Ltd., Feb. 28, 2006, vol. 25, No. 4, pp. 14-15.

Schoreels C., "Agent based Genetic Algorithm Employing Financial Technical Analysis for Making Trading Decisions Using Historical Equity Market Data," IEEE/WIC/ACM International Conference on Intelligent Agent Technology (IAT2004), Beijing, China, Sep. 20-24, 2004, pp. 421-424.

Streichert F., "Introduction to Evolutionary Algorithms," paper to be presented Apr. 4, 2002 at the Frankfurt MathFinance Workshop Mar. 30, 2002, Frankfurt, Germany, XP55038571, 22 pp. (retrieved from the Internet: URL: http://www.ra.cs.uni-tuebingen.de/mitarb/streiche/publications/Introduction to E volutionary Algorithms.pdf).

Tanev, I. et al., "Scalable architecture for parallel distributed implementation of genetic programming on network of workstations," J. Systems Architecture, vol. 47, Jul. 2001, pp. 557-572.

U.S. Appl. No. 13/184,307—Office Action dated Oct. 21, 2013, 16 pages.

Hornby, Gregory S.,"The Age-Layered Population Structure (ALPS) Evolutionary Algorithm," ACM; GECCO Jul. 8-12, 2009; 7 pages.

U.S. Appl. No. 13/358,381—Office Action dated Jul. 8, 2014, 30 pages.

Freitas, A., "A review of evolutionary algorithms for data mining." Soft Computing for Knowledge Discovery and Data Mining, Springer US, 2008, pp. 79-111.

U.S. Appl. No. 13/540,507—Office Action dated Sep. 9, 2014, 25 pages.

U.S. Appl. No. 13/184,307—Notice of Allowance dated Aug. 4, 2014, 9 pages.

* cited by examiner

| | INDIVIDUAL ID | EXPERIENCE | FITNESS | | | |
|---|---|---|---|---|---|---|
| RULE 1 | P/V 1.1 | P/V 1.2 | ... | P/V 1.M | ACTION 1 | LABEL |
| RULE 2 | P/V 2.1 | P/V 2.2 | ... | P/V 2.M | ACTION 2 | LABEL |
| RULE 3 | P/V 3.1 | P/V 3.2 | ... | P/V 3.M | ACTION 3 | LABEL |
| RULE 4 | P/V 4.1 | P/V 4.2 | ... | P/V 4.M | ACTION 4 | LABEL |
| RULE 5 | P/V 5.1 | P/V 5.2 | ... | P/V 5.M | ACTION 5 | LABEL |
| ... | ... | ... | ... | ... | ... | ... |
| RULE N | P/V N.1 | P/V N.2 | ... | P/V N.M | ACTION N | LABEL |

| | |
|---|---|
| POS.1 | Tick 1, IBM, 1000, LBL1 |

FIG. 13A

| | |
|---|---|
| POS.2 | Tick 2, IBM, 1000, LBL2 |
| POS.1 | Tick 1, IBM, 1000, LBL1 |

FIG. 13B

| | |
|---|---|
| POS.3 | Tick 3, IBM, 1000, LBL1 |
| POS.2 | Tick 2, IBM, 1000, LBL2 |
| POS.1 | Tick 1, IBM, 1000, LBL1 |

FIG. 13C

| | |
|---|---|
| POS.3 | Tick 3, IBM, 1000, LBL1 |
| POS.2 | Tick 2, IBM, 400, LBL2 |
| POS.1 | Tick 1, IBM, 1000, LBL1 |

FIG. 13D

| | |
|---|---|
| POS.3 | Tick 3, IBM, 1000, LBL1 |
| POS.2 | Tick 2, IBM, 400, LBL2 |
| POS.1 | Tick 1, IBM, 300, LBL1 |

FIG. 13E

| | |
|---|---|
| POS.3 | Tick 3, IBM, 600, LBL1 |
| POS.2 | Tick 2, IBM, 400, LBL2 |
| POS.1 | Tick 1, IBM, 0, LBL1 |

FIG. 13F

| | |
|---|---|
| POS.3 | Tick 3, IBM, 600, LBL1 |
| POS.2 | Tick 2, IBM, 0, LBL2 |
| POS.1 | Tick 1, IBM, 0, LBL1 |

FIG. 13G

| | |
|---|---|
| POS.3 | Tick 3, IBM, 0, LBL1 |
| POS.2 | Tick 2, IBM, 0, LBL2 |
| POS.1 | Tick 1, IBM, 0, LBL1 |

FIG. 13H

DATA MINING TECHNIQUE WITH POSITION LABELING

CROSS-REFERENCE TO OTHER APPLICATIONS

This application claims priority to U.S. Provisional Application No. 61/789,387, filed 15 Mar. 2013.

The following patent applications are incorporated herein for their teachings: U.S. patent application Ser. No. 13/184,307, filed 15 Jul. 2011, entitled "DATA MINING TECHNIQUE WITH EXPERIENCE-LAYERED GENE POOL"; U.S. patent application Ser. No. 13/358,381, filed 25 Jan. 2012, entitled "DATA MINING TECHNIQUE WITH MAINTENANCE OF FITNESS HISTORY"; and U.S. patent application Ser. No. 13/540,507, filed 2 Jul. 2012, entitled "DATA MINING TECHNIQUE WITH DIVERSITY PROMOTION".

BACKGROUND

The invention relates generally to a novel data mining technique, and more particularly, to novel ways to use genetic algorithms to extract useful rules or relationships from a data set for use in controlling systems.

In many environments, a large amount of data can be or has been collected which records experience over time within the environment. For example, a healthcare environment may record clinical data, diagnoses and treatment regimens for a large number of patients, as well as outcomes. A business environment may record customer information such as who they are and what they do, and their browsing and purchasing histories. A computer security environment may record a large number of software code examples that have been found to be malicious. A financial asset trading environment may record historical price trends and related statistics about numerous financial assets (e.g., securities, indices, currencies) over a long period of time. Despite the large quantities of such data, or perhaps because of it, deriving useful knowledge from such data stores can be a daunting task.

The process of extracting patterns from such data sets is known as data mining. Many techniques have been applied to the problem, but the present discussion concerns a class of techniques known as genetic algorithms. Genetic algorithms have been applied to all of the above-mentioned environments. With respect to stock categorization, for example, according to one theory, at any given time, 5% of stocks follow a trend. Genetic algorithms are thus sometimes used, with some success, to categorize a stock as following or not following a trend.

Evolutionary algorithms, which are supersets of Genetic Algorithms, are good at traversing chaotic search spaces. According to Koza, J. R., "Genetic Programming: On the Programming of Computers by Means of Natural Selection", MIT Press (1992), incorporated by reference herein, an evolutionary algorithm can be used to evolve complete programs in declarative notation. The basic elements of an evolutionary algorithm are an environment, a model for a genotype (referred to herein as an "individual"), a fitness function, and a procreation function. An environment may be a model of any problem statement. An individual may be defined by a set of rules governing its behavior within the environment. A rule may be a list of conditions followed by an action or assertion to be performed in the environment. A fitness function may be defined by the degree to which an evolving rule set is successfully negotiating the environment. A fitness function is thus used for evaluating the fitness of each individual in the environment. A procreation function generates new individuals by mixing rules with the fittest of the parent individuals. In each generation, a new population of individuals is created.

At the start of the evolutionary process, individuals constituting the initial population are created randomly, by putting together the building blocks, or alphabets, that form an individual. In genetic programming, the alphabets are a set of conditions and assertions making up rules governing the behavior of the individual within the environment. Once a population is established, it is evaluated using the fitness function. Individuals with the highest fitness are then used to create the next generation in a process called procreation. Through procreation, rules of parent individuals are mixed, and sometimes mutated (i.e., a random change is made in a rule) to create a new rule set. This new rule set is then assigned to a child individual that will be a member of the new generation. In some incarnations, known as elitist methods, the fittest members of the previous generation, called elitists, are also preserved into the next generation.

A common problem with evolutionary algorithms is that of premature convergence: after some number of evaluations the population converges to local optima and no further improvements are made no matter how much longer the algorithm is run. A number of solutions to the problem have been proposed. In one solution, convergence is slowed by increasing the mutation rate, mutation size or population size. Other solutions involve modifying the replacement strategy, modifying the fitness of individuals based on similarity to each other, and by spatially distributing individuals and restricting them to interact only with spatial neighbors. In yet another solution, known as the Age-Layered Population Structure (ALPS), an individual's age is used to restrict competition and breeding between individuals in the population. In the parlance of ALPS, "age" is a measure of the number of times that an individual's genetic material has survived a generation (i.e., the number of times it has been preserved due to being selected into the elitist pool). All of these techniques have benefits and detriments, and may or may not work well in a data mining environment.

In the above-incorporated "DATA MINING TECHNIQUE WITH EXPERIENCE-LAYERED GENE POOL" application, roughly described, a computer-implemented evolutionary data mining system includes a memory storing a candidate database in which each candidate individual has a respective fitness estimate; a candidate pool processor which tests individuals from the candidate pool on training data and updates the fitness estimate associated with the individuals in dependence upon the tests; and a harvesting module providing for deployment selected ones of the individuals from the candidate pool, wherein the candidate pool processor includes a competition module which selects individuals for discarding from the pool in dependence upon both their updated fitness estimate and their testing experience level. Though not required for all embodiments of the invention, in embodiments herein, the candidate database has an elitist pool containing multiple experience layers, and the competition module causes individuals to compete only with other individuals in their same experience layer.

SUMMARY

While the techniques described in the above patent application can work well, Applicants have recognized that a problem arises in domains in which the system being modeled by the individuals has a persistent state, and there is value in knowing how a particular state was entered. For example, consider the design of a robot tasked with pursuing a moving target on a two dimensional field. There are two targets moving about on the field, but the robot can catch up with a target only if it continuously pursues that one target. The robot can turn, or step forward, and the robot's senses can determine the relative direction of a given target. A typical robot rule set without state might look like this:

IF target1 is on my left THEN turn left;
IF target1 is ahead THEN move forward;
. . .
IF target2 is on my left THEN turn left;
IF target2 is ahead THEN move forward;
. . .

However, such a system would not be able to catch a target on every trial, as on every step, it 'forgets' which target it was pursuing the step before. On the other hand, if the robot is able to remember which target it was pursuing when it selected its most recent previous assertion, then it might evolve rules that would ensure that it continuously pursues a single target. Such rules might look like this:

IF target1 is on my left AND my most recent assertion was in pursuit of target1, THEN turn left;
IF target1 is ahead AND my most recent assertion was in pursuit of target1, THEN move forward and set label to A;
. . .
IF target2 is on my left AND my most recent assertion was in pursuit of target2, THEN turn left;
IF target2 is ahead AND my most recent assertion was in pursuit of target2, THEN move forward;
. . .

Note that the "state" of the system that is useful in the above rules is not merely the most recent assertion (turn left or move forward), but the reason why that assertion was chosen (to pursue target 1 or to pursue target 2).

As another example, consider the design of a system to invest in securities. The system can purchase securities or sell securities, and is aware of recent price movement of the security. A simple rule set might look like this:

IF price is 10% below the average price over the last week, THEN purchase 1000 shares.
IF price is 10% above the average price over the last week, THEN sell 1000 shares.

While a rule set like this might make a profit, it is more likely to make a profit if the system can detect patterns of price movement and knows to purchase when the beginning of a pattern reveals itself, and sell when the end of the pattern reveals itself (or vice-versa). In such a situation it would be desirable for the system to know, upon detection of the end of the pattern, that the previous purchase of shares was due to detection of the beginning of the pattern rather than for some other reason. In this case the system might evolve rules that would ensure that it exits a position on detection of the end of the same pattern which triggered its entry into that position. A rules set to accomplish this might look like this:

IF beginning of pattern 1 detected, THEN purchase 1000 shares.
IF end of pattern 1 detected AND shares previously purchased were purchased because the beginning of pattern 1 had been detected, THEN sell 1000 shares.

Again, note that the "state" of the system that is useful in the above rules is not merely that the system currently holds 1000 shares, but the reason why the shares had been purchased (due to detection of the beginning of pattern 1).

Accordingly, roughly described, individuals in both the training system and in the production system include a label field in their rule outputs. Positions entered by an individual are maintained in a status record for the individual, including the label output by the rule which triggered entry of that position. Rules that assert exiting or partial exiting of a position also output the label from the rule which triggered the assertion, and are effective only so far as matching positions exist or remain in the individual's status record, including a matching label. Labels present in the status record also can be referenced in conditions of a rule. During evolution, a rule's output label is subject to crossover and/or mutation just like the conditions and output assertions.

The above summary of the invention is provided in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description that is presented later. Particular aspects of the invention are described in the claims, specification and drawings.

BRIEF DESCRIPTION OF THE DRAWINGS

The invention will be described with respect to specific embodiments thereof, and reference will be made to the drawings, in which:

FIGS. 13A, 13B, 13C, 13D, 13E, 13F, 13G and 13H (collectively FIG. 13) illustrate the contents of a status record at various points in an example sequence of trades.

DETAILED DESCRIPTION

Figure 1:
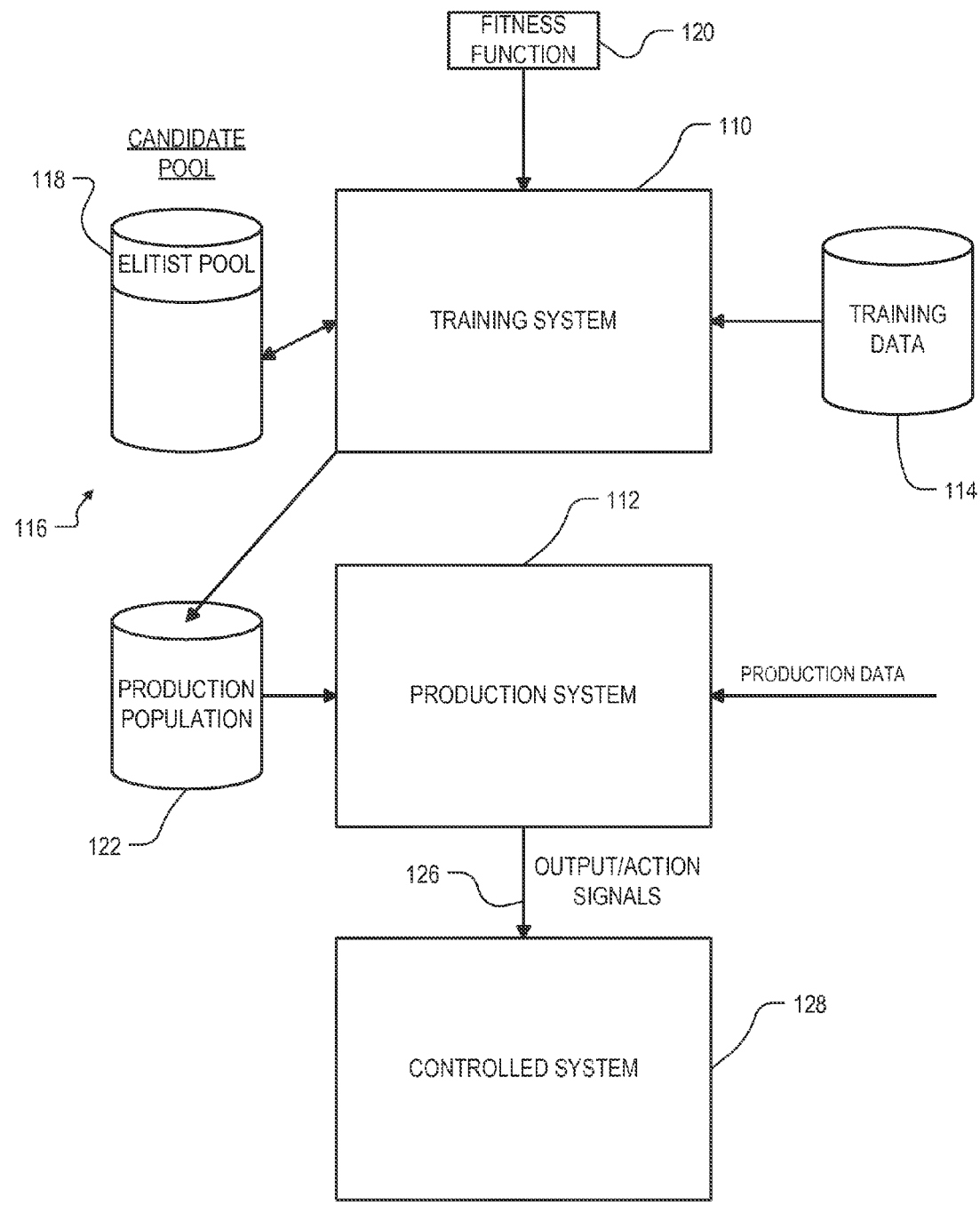
FIG. 1 is an overall diagram of an embodiment of a data mining system incorporating features of the invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Data mining involves searching for patterns in a database. The fittest individuals are considered to be those that identify patterns in the database that optimize for some result. In embodiments herein, the database is a training database, and the result is also represented in some way in the database. Once fit individuals have been identified, they can be used to identify patterns in production data which are likely to produce the desired result. In a robotics environment, the individual can be used to detect patterns in the environment and assert control signals to the robots motors. In a healthcare environment, the individual can be used to point out patterns in diagnosis and treatment data which should be studied more closely as likely either improving or degrading a patient's diagnosis. In a financial assets trading environment, the individual can be used to detect patterns in real time data and assert trading signals to a trading desk. The assertion signals from an individual can be transmitted to the appropriate controlled system for execution.

In some data mining environments in which evolutionary algorithms can be applied, the fitness of a particular individual can be determined exactly. In others, fitness of a particular individual usually cannot be determined by a single test of the individual on the data; rather, the fitness estimation itself tends to vary as it is tested on more and more samples in the training database. The fitness estimate can be inaccurate as testing begins, and confidence in its accuracy increases as testing on more samples continues. While aspects of the invention can be used with both types of environments, most of the embodiments discussed herein address the latter type of environment. In such an environment it is advantageous to consider individuals for an elitist pool only after they have completed testing on a predetermined number of samples, for example 1000 samples. Once an individual has reached that minimum threshold experience level, comparisons with other individuals are considered valid and can compete on the basis of fitness for a place in the elitist pool. Preferably, the elitist pool is divided into two or more layers on the basis of experience level. For example, layer 1 ($L_1$) may include only those individuals that have been tested on 1000-1999 samples, while a layer 2 ($L_2$) includes all individuals that have been tested on 2000 or more samples. Individuals compete only against other individuals within the same experience layer. In general, in embodiments herein, the elitist pool contains T layers numbered $L_1$-$L_T$, with T>1. The overall pool of candidate individuals also includes some that have not yet undergone sufficient numbers of tests to be considered for the elitist pool, and those individuals are considered herein to reside in a layer below the elitist pool, designated layer 0 ($L_0$). Each i'th one of the layers in [$L_0$ . . . $L_{T-1}$] contains only individuals with a respective range of testing experience [ExpMin($L_i$) . . . ExpMax($L_i$)], each ExpMin($L_{i+1}$)>ExpMax ($L_i$). The minimum experience level of the bottom layer $L_0$ is 0, and the top layer $L_T$ has a minimum experience level ExpMin($L_T$) but no maximum experience level. Preferably, the experience ranges of contiguous layers are themselves contiguous, so that ExpMin($L_{i+1}$)=ExpMax($L_i$)+1, for 0<=i<T. As used herein, if an individual is said herein to be "in" a particular layer, this is merely a shortcut way of saying that its testing experience level is within the range of testing experience levels of the particular layer.

In an embodiment, each layer i in the elitist pool (i.e. in layers [$L_1$ . . . $L_T$]) is permitted to hold a respective maximum number of individuals, Quota($L_i$). The quota is chosen to be small enough to ensure competition among the individuals within the corresponding range of experience levels, but large enough to ensure sufficient diversity among the fit individuals that graduate to the next higher layer. Preferably the quota of each such layer is fixed, but in another embodiment it could vary. The quota of layer $L_0$ is not chosen based on these criteria, since the individuals in that layer do not yet compete. Preferably the number of layers T in the elitist pool is also fixed, but in another embodiment it can vary.

As each individual gains more experience, assuming it is not displaced within its current experience layer, it will eventually graduate to the next higher experience layer. If the next higher experience layer is not yet full, then the individual is added to that layer. If it is full, then the individual has to compete for its place in that layer. If it is fitter than the least fit individual in that layer, it will be accepted into that layer and the least fit individual will be discarded. If not, then the graduating individual will be discarded and the individuals in the next higher layer will be retained.

Either way, a space is opened in the current experience layer (the layer from which the individual is graduating). The open space means that the next individual graduating into the current experience layer from below will be accepted without having to compete for its place—thereby defeating a purpose of the elitist pool. To mitigate this problem, an embodiment introduces the concept of an elitist pool minimum fitness, which in one embodiment is set to the minimum fitness of the top layer. The individuals in the top layer are assumed to have a relatively accurate estimate of their fitness, and since after the top layer is full the goal of the evolutionary algorithm is to identify individuals that are better than the ones already there, it makes sense to avoid devoting resources to individuals which already appear to be inferior. Thus in the embodiment, once the elitist pool minimum fitness is set, any individual being considered into the elitist pool can only be added if it has a fitness value above the elitist pool minimum fitness. Stated differently, once the top layer $L_T$ is full, individuals are not allowed to enter $L_1$ unless their fitness level is at least as high as the minimum fitness FitMin($L_T$) of the top layer $L_T$ (or, in alternative embodiments, at least as high as some predetermined function of FitMin($L_T$)). Many variations on this technique can be found in the above-incorporated "DATA MINING TECHNIQUE WITH EXPERIENCE-LAYERED GENE POOL" application.

Individuals that enter the top layer may themselves undergo further testing on samples in the training database. With such further experience, the fitness estimate of even those individuals may change. This can introduce a wave effect in the top layer due to fluctuations in fitness estimates of the individual with minimum fitness. This will, in turn, affect the elitist pool minimum fitness if the top layer is at quota. If the fitness estimate of the individual with the minimum fitness in the top layer decreases, then the minimum fitness of the top layer (and hence the entire elitist pool minimum fitness) will decrease. In order to prevent this, in one embodiment, individuals that have reached the top layer do not undergo further testing. The justification here is that individuals in the top layer are assumed to already have fitness estimates which are as representative as possible to their actual fitness. Such an embodiment accepts any remaining error in the fitness estimate because the likelihood that purely random variations at that point would exceed an error range already considered acceptable, is too large.

In one embodiment, individuals are harvested from the entire elitist pool for use against production data. In another embodiment, only individuals that have reached the top layer are subject to harvesting. In either embodiment, further selection criteria can be applied in the harvesting process. Such criteria is usually specific to the application environment, and can include, for example, fitness, consistency, and so on.

EXAMPLE EMBODIMENT

FIG. 1 is an overall diagram of an embodiment of a data mining system incorporating features of the invention. The system is divided into three portions, a training system 110, a production system 112, and a controlled system 128. The training system 110 interacts with a database 114 containing training data, as well as with another database 116 containing the candidate pool. As used herein, the term "database" does not necessarily imply any unity of structure. For example, two or more separate databases, when considered together, still constitute a "database" as that term is used herein. The candidate pool database 116 includes a portion 118 containing the elitist pool. The training system 110 operates according to a fitness function 120, which indicates to the training system 110 how to measure the fitness of an individual. The training system 110 optimizes for individuals that have the greatest fitness, however fitness is defined by the fitness function 120. The fitness function is specific to the environment and goals of the particular application. For example, the fitness function may be a function of the predictive value of the individual as assessed against the training data—the more often the individual correctly predicts the result represented in the training data, the more fit the individual is considered. In a financial asset trading environment, an individual might assert trading signals (e.g. buy, sell, hold current position, exit current position), and fitness may be measured by the individual's ability to make a profit, or the ability to do so while maintaining stability, or some other desired property. In the healthcare domain, an individual might propose a diagnosis based on patient prior treatment and current vital signs, and fitness may be measured by the accuracy of that diagnosis as represented in the training data.

The production system 112 operates according to a production population in another database 122. The production system 112 applies these individuals to production data 124, and produces outputs 126, which may be action signals or recommendations. In the robotics environment, for example, the production data 124 may be a stream of real time sensing data and the outputs 126 of the production system may be the control signals that one or more of the individuals in production population 122 outputs in response to the production data 124. In the financial asset trading environment the production data 124 may be a stream of real time stock prices and the outputs 126 of the production system 112 may be the trading signals or instructions that one or more of the individuals in production population 122 outputs in response to the production data 124. In the healthcare domain, the production data 124 may be current patient data, and the outputs 126 of the production system 112 may be a suggested diagnosis or treatment regimen that one or more of the individuals in production population 122 outputs in response to the production data 124. The production population 122 is harvested from the training system 110 once or at intervals, depending on the embodiment. Preferably, only individuals from elitist pool 118 are permitted to be harvested. In an embodiment, further selection criteria is applied in the harvesting process.

The controlled system 128 is a system that is controlled automatically by the signals 126 from the production system. In the robotics environment, for example, the controlled system may be the motors and solenoids of the robot. In the financial asset trading environment, the controlled system may be a fully automated brokerage system which receives the trading signals via a computer network (not shown) and takes the indicated action. Depending on the application environment, the controlled system 128 may also include mechanical systems such as a engines, air-conditioners, refrigerators, electric motors, robots, milling equipment, construction equipment, or a manufacturing plant.

Figure 2:
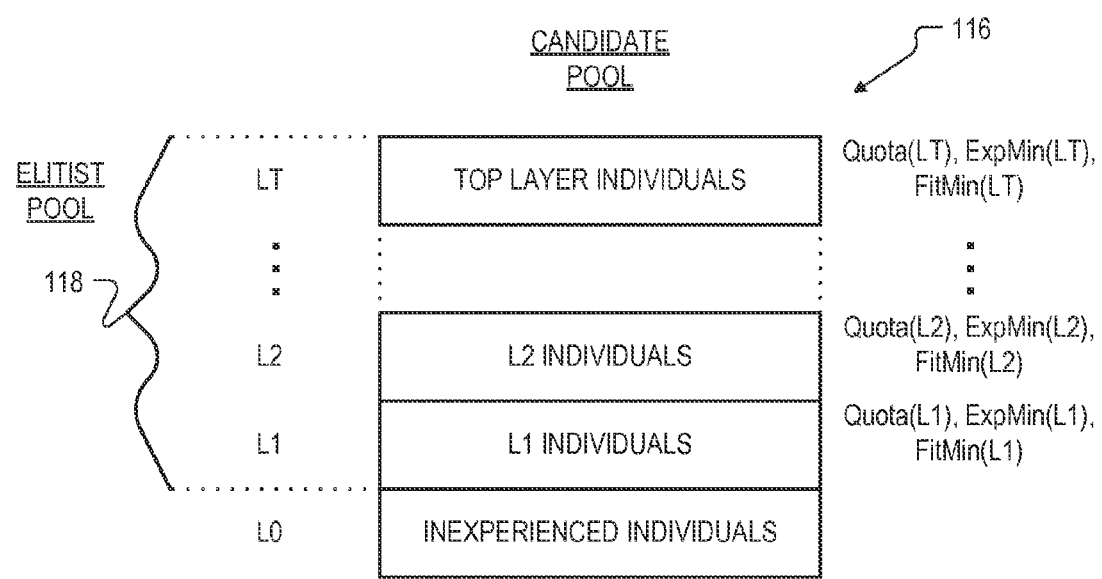
FIG. 2 is a symbolic drawing of the candidate pool in FIG. 1.

FIG. 2 is a symbolic drawing of the candidate pool 116 in FIG. 1. As can be seen, the individuals in the pool are stratified into T+1 "experience layers", labeled $L_0$ through $L_T$. The individuals in $L_0$ are very inexperienced (have been tested on only a relatively small number of samples in training data 114, if any), whereas the higher layers contain individuals in successively greater experience ranges. The layers $L_1$ through $L_T$ constitute the elitist pool 118 (FIG. 1). Each layer i in the elitist pool 118 has associated therewith three "layer parameters": a quota $Quota(L_i)$ for the layer, a range of experience levels $[ExpMin(L_i) \ldots ExpMax(L_i)]$ for the layer, and the minimum fitness $FitMin(L_i)$ for the layer. For example, an embodiment in the financial asset trading environment may have on the order of 40 or 50 layers in the elitist pool, each containing individuals with experience levels within a range on the order of 4000-5000 trials. The minimum experience level $ExpMin(L_1)$ may be on the order of 8000-10,000 trials, and each layer may have a quota on the order of 100 individuals.

In the embodiment of FIG. 2, the quotas for all the layers in the elitist pool 118 are equal and fixed. Neither is required in another embodiment. In addition, $ExpMin(L_0)=0$ in this embodiment. Also, as the experience ranges of the layers are contiguous, ExpMin of each layer can be inferred as one higher than ExpMax of the next lower layer, or ExpMax of each layer can be inferred as one lower than ExpMin of the next higher layer. Thus only the minimum experience level or the maximum experience level need be specified for each layer. In the embodiment, only the minimum experience levels are specified, and they are specified for layers $L_1$-$L_T$; in another embodiment only the maximum experience levels are specified, and they are specified for layers $L_0$-$L_{T-1}$. In yet another embodiment, the size of the range of experience layers assigned to all the layers is constant, and only one minimum or maximum experience level is specified in the layer parameters; the remainder are calculated algorithmically as needed. Other variations will be apparent.

The FitMin( ) values in FIG. 2 are not specified a priori. Rather, they are filled by copying from the fitness estimate associated with the least fit individual in each layer. Whenever the fitness estimate of the least fit individual is updated, and whenever the least fit individual itself is replaced, the FitMin( ) value associated with the layer is updated correspondingly. The FitMin( ) values are needed for comparing to the fitness estimation of individuals coming up from the next lower layer, and having them associated directly with each layer can simplify this comparison. In another embodiment, each layer can instead contain a pointer to the least fit individual in the layer, and the comparison method can obtain the layer minimum fitness from that individual itself. In general, each layer has associated with it an "indication" of the minimum fitness in the layer. As used herein, an "indication" of an item of information does not necessarily require the direct specification of that item of information. Information can be "indicated" in a field by simply referring to the actual information through one or more layers of indirection, or by identifying one or more items of different information which are together sufficient to determine the actual item of information. In addition, the term "identification" and its variants are used herein to mean the same as "indication".

In one embodiment, the experience layer in candidate pool 116 define separate regions of memory, and the individuals having experience levels within the range of each particular layer are stored physically within that layer. Preferably, however, the experience layers are only implied by the layer parameters and the individuals can actually be located anywhere in memory. In one embodiment, the individuals in candidate pool 116 are stored and managed by conventional database management systems (DBMS), and are accessed using SQL statements. Thus a conventional SQL query can be used to obtain, for example, the fitness estimate of the least fit individual in the highest layer. New individuals can be inserted into the candidate pool 116 using the SQL "insert" statement, and individuals being discarded can be deleted using the SQL "delete" statement. In another embodiment, the individuals in candidate pool 116 are stored in a linked list. In such an embodiment insertion of a new individual can be accomplished by writing its contents into an element in a free list, and then linking the element into the main linked list. Discarding of individuals involves unlinking them from the main linked list and re-linking them into the free list.

Figures 3, 3A:
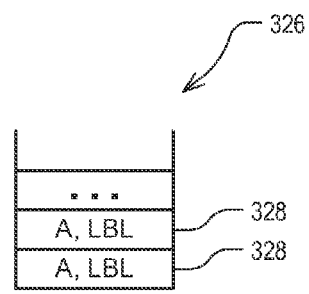
FIG. 3 is a symbolic drawing of an individual in the candidate pool.
FIG. 3A is a symbolic drawing of a status record according to aspects of the invention.

FIG. 3 is a symbolic drawing of an individual 310 in the candidate pool 116. (An individual in the production population 122 can be identical, except that it can omit the experience field 314 and/or the fitness field 316). As used herein, an "individual" is defined by its contents. An individual created by procreation is considered herein to constitute a different individual than its parents, even though it retains some if its parents' genetic material. In this embodiment, the individual identifies an ID 312, its experience level 314, and its current fitness estimate 316. It also includes one or more "rules" 318, each of which contains one or more conditions 320, an action 322 to be asserted if all the conditions in a given sample are true, and a label 324 discussed below. The "output" of a rule herein includes both the action 322 and the label 324; other embodiments might include additional output fields. For example, another embodiment might include a "strength" or "confidence" field in addition to action and label. During procreation, any of the conditions or any of the outputs may be altered, including either or both of the actions and the label. Entire rules may be replaced as well. The individual's experience level 314 increments by one for each sample of the training data 114 on which it is tested, and its fitness estimate 316 is determined by fitness function 120, averaged (or otherwise combined) over the all the trials.

A rule in the embodiment of FIG. 3 is a conjunctive list of indicator-based conditions in association with an output. Indicators are the system inputs that can be fed to a condition. These indicators are represented in the training database 114, as well as in the production data 124. Indicators can also be introspective, for example by indicating the fitness estimate of the individual at any given moment. As described further herein, introspective indicators can also include the current state of the system. In the embodiment of FIG. 1, the individual's conditions are all specified as parameter/value ("P/V") pairs. That is, if in the current sample, the specified parameter has the specified value (or range of values), then the condition is true. Another embodiment can also include conditions which are themselves conditioned on other items (such as other conditions in the rule or in a different rule or the result of another entire one of the rules). Yet another embodiment can also include conditions or rules which are specified procedurally rather than as P/V pairs. Many other variations will be apparent.

In embodiments described herein, an individual is required to be complete upon creation, though what constitutes completion is specific to the domain. In many domains for example, including certain securities trading domains described herein, an individual is required to include at least one rule for entering a position (e.g. Buy or Short), and at least one rule for exiting a position (e.g. Long Exit or Short Exit).

In embodiments described herein, each individual 310 also has associated therewith a status record 326 as illustrated symbolically in FIG. 3A. Record 326 maintains aspects of the current state of the system, to the extent pertinent to its corresponding individual 310. Status record 326 is a list of entries 328, each of which identifies both the action 322 and the label 324 of a rule that previously fired. Entries may also identify other data such as an execution time and details of the position taken (which, in a financial trading domain might include the name of the security purchased or shorted, the number of shares, and the price). In the production system 112, when an individual whose action involves entering a position fires, then once its execution is confirmed, not only does the rule's action cause an action to occur, but both the rule's action and its label are also entered into the status record 326. When an individual whose action involves exiting a position fires, then once its execution is confirmed, not only is the rule's action effected, but a corresponding position reflected in the status record 326 is reduced or eliminated. Only a matching state is modified: the state must identify the same (or otherwise "matching") label as the one identified in the exiting rule.

A "status record" may also be referred to sometimes herein as a "status table" or "status bucket" or "status database". It need not necessarily be unitary in memory. As the term is used herein, a "status record" is distinguished from a "log", although in some embodiments a status record can be implemented as a simple log. Preferably, however, a status record indicates the positions of the corresponding individual resulting from prior activation of entering and exiting rules of the corresponding individual, only to the extent that such positions currently remain. In other words, once a position is reduced, a search of the status record preferably no longer reveals what the previous high value of the position was. And once a position is reduced to zero, preferably the position no longer appears at all in the status record. This helps simplify a search of the status record to determine the individual's current position. If it is desired to also maintain a history of asserted actions, then preferably a separate log is maintained in addition to the status records. (In an embodiment in which zeroed-out positions still appear in the status record, one such embodiment might still indicate the label for that position whereas another such embodiment might not.)

In the present embodiment, a rule "fires" (i.e., asserts an action in response to the training data or other input data) if it resolves to TRUE. However, in a preferred embodiment, not all actions that are asserted are necessarily executed. Other filters may be applied first in various embodiments, including, for example, selecting among more than one rule of an individual, all of which fired in response to application of a single item of data. Once the system confirms a rule's assertion, the rule or the action it asserts is considered herein to be "activated".

The term "state" is used herein to mean both the singular and the plural: A "state" of a system may be defined by the states of one or more subsystems, each of which is also referred to herein as a "state". For example, the temperature of the water coming out of a faucet may depend on the position of the hot water knob and the position of the cold water knob. If the temperature of the water is referred to as the "state" of the faucet, then the position of the hot water knob can be referred to as either the "state" of the hot water knob or a "sub-state" of the faucet or both, and the position of the cold water knob can be referred to as either the "state" of the cold water knob or another "sub-state" of the faucet or both.

In a financial asset trading embodiment, during training, an individual can be thought of as a virtual trader that is given a hypothetical sum of money to trade using historical data. Such trades are performed in accordance with a set of rules that define the individual thereby prompting it to buy, sell, hold its position, or exit its position. The action outputs of the rules are trading action signals or instructions, such as Buy, Short, Long Exit and Short Exit. In some embodiments, rules may also be designed to contain gain-goal and stop-loss targets, thus rendering the exit action redundant. A hold occurs when no rule in the individual is triggered, therefore, the individual effectively holds its current position. The indicators on which the rules are based can be, for example, a time increment ("tick"), or the closing price for a stock day. Preferably the indicators also include current state, including label, so that an exit rule can evolve a rule for exiting position previously entered, but only if the entry occurred for the same reason (same label).

The following code defines four example rules of an individual in terms of conditions and indicators, as well as the outputs of each rule, in accordance with one embodiment of the present invention:

1. if (!(tick=(−54/10000)% prev tick and MACD is negative)
and !(tick=(−119/10000)% prev tick
then SHORT [LBL4]
2. if (!(tick=(−54/10000)% prev tick and MACD is negative)
and !(tick=(−119/10000)% prev tick and Position is long))
and !(ADX×100<=5052))
then SHORT [LBL5]
3. if (Label=4 and PositionProfit>=2% and tick=(−54/10000)% prev tick
and momentum<15)
then SHORT EXIT [LBL5]
4. if (!(tick=(−119/10000)% prev tick and PositionProfit<1% and tick=(−54/10000)% prev tick)
and momentum<15)
then SHORT EXIT [LBL4]

where "and" represents logical "AND" operation, "!" represents logical "NOT" operation, "tick", "MACD" and "ADX" are stock indicators, and "PositionProfit" represents the profit position of the individual. The output of each of the rules includes both an action ("SHORT" represents action to buy short, "SHORT EXIT" represents action to exit a short position), and a label ("[LBL4]" means Label 4 and "[LBL5]" means Label 5). Thus the above individual contains four rules.

The output of each of the above rules includes both an action ("SHORT" represents action to sell short, "SHORT EXIT" represents action to exit a short position), and a label ("[LBL4]" means Label 4 and "[LBL5]" means Label 5). The particular security to short is implied by the algorithm in which the individuals are applied. In one embodiment, for example, individuals are specific to one security, and in this case the security implied in an individual's rules is the one to which the individual relates. In another embodiment each individual is tested within a loop, which applies the individual to the data against each security in a portfolio sequentially. In such an embodiment, when a rule fires, the particular security to which it applies is the one currently being considered within the loop. Another embodiment might indicate the security within the rule's output fields. Similarly, the quantity to short is implied by a default. Another embodiment might indicate the quantity within the rule's output fields.

Thus Rules 1 and 2 in the above example are entry rules, and Rules 3 and 4 in the above example are exit rules. If a position is entered due to the firing of Rule 1, then an entry 328 is placed into the status record 326 which indicates the action SHORT, and the label LBL4. Similarly, if a position is entered due to the firing of Rule 2, then an entry 328 is placed into the status record 326 which indicates the action SHORT, and the label LBL5. In both cases the entries 328 preferably also indicate the security and the number of shares. If the status record 326 already contains an entry representing a short position of the same security, with the same label, then in one embodiment the system merges the new position into the existing one by simply summing the quantity. In another embodiment the positions remain separate in the status record 326.

If a position is to be exited due to the firing of Rule 3, then the label LBL5 indicates that only positions represented in the status record 326 with label LBL5 are to be exited. Similarly, if a position is to be exited due to the firing of Rule 4, then the label LBL4 indicates that only positions represented in the status record 326 with label LBL4 are to be exited. In both cases the particular security implied by the rule must also match. Example Rule 4 above also illustrates the use of a label as part of the rule's conditions. In particular, the conjunctively specified condition "Label=4" means that the rule will not fire unless a position exists somewhere in the status record which had been entered with label LBL4.

The training data is arranged in the database 114 as a set of samples, each with parameters and their values, as well as sufficient information to determine a result that can be compared with an assertion made by an individual on the values in the sample. In one embodiment, the result is explicit, for example a number set out explicitly in association with the sample. In such an embodiment, the fitness function can be dependent upon the number of samples for which the individual's assertion output matches the result of the sample. In another embodiment, such as in the financial asset trading embodiment, the result may be only implicit. For example, the sample may include the price of an asset at each tick throughout a trading day, and the training system 110 must hypothetically perform all the trading recommendations made by the individual throughout the trading day in order to determine whether and to what extent the individual made a profit or loss. The fitness function can be dependent upon the profit or loss that the individual, as a hypothetical trader, would have made using the tick data for the sample.

Figure 4:
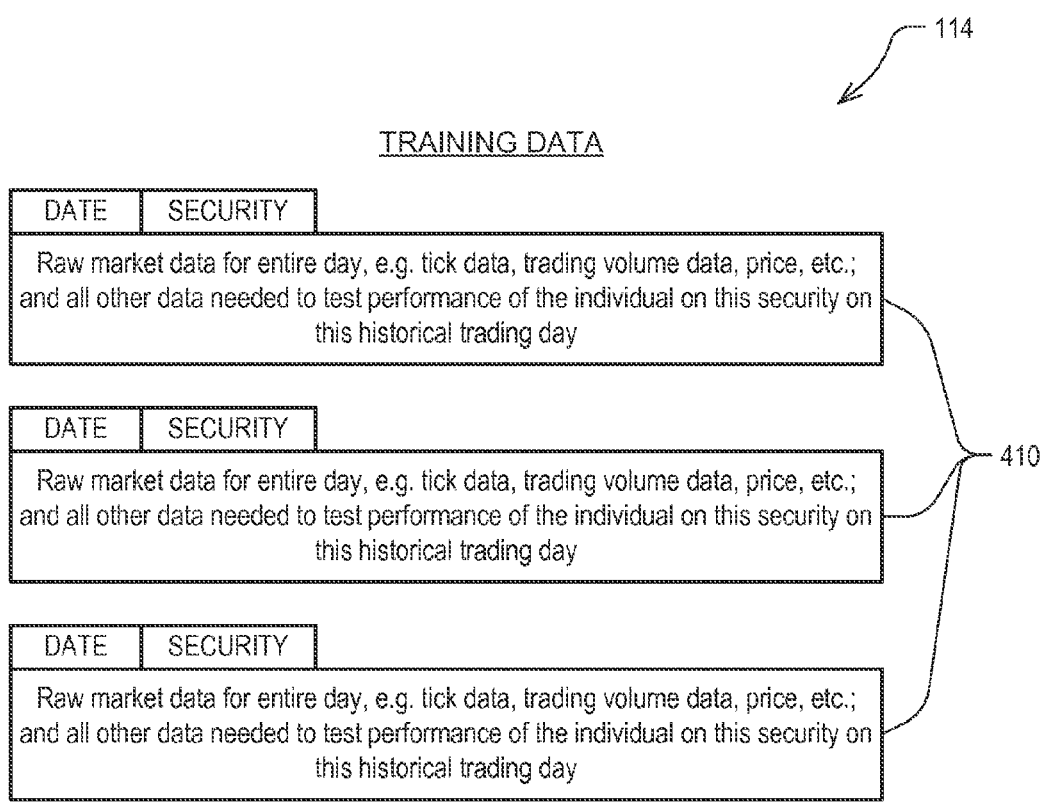
FIG. 4 is a symbolic drawing indicating how the training data database is organized.

FIG. 4 is a symbolic drawing indicating how the training data is organized in the database 114. The illustration in FIG. 4 is for the financial asset trading embodiment, and it will be understood how it can be modified for use in other environments. Referring to FIG. 4, three samples 410 are shown. Each sample includes a historical date, an identification of a particular security or other financial asset (such as a particular stock symbol), and raw historical market data for that financial asset on that entire trading day, e.g. tick data, trading volume data, price, etc.; and all other data needed to test performance of the individual's trading recommendations on this asset on this historical trading day.

Figure 5:
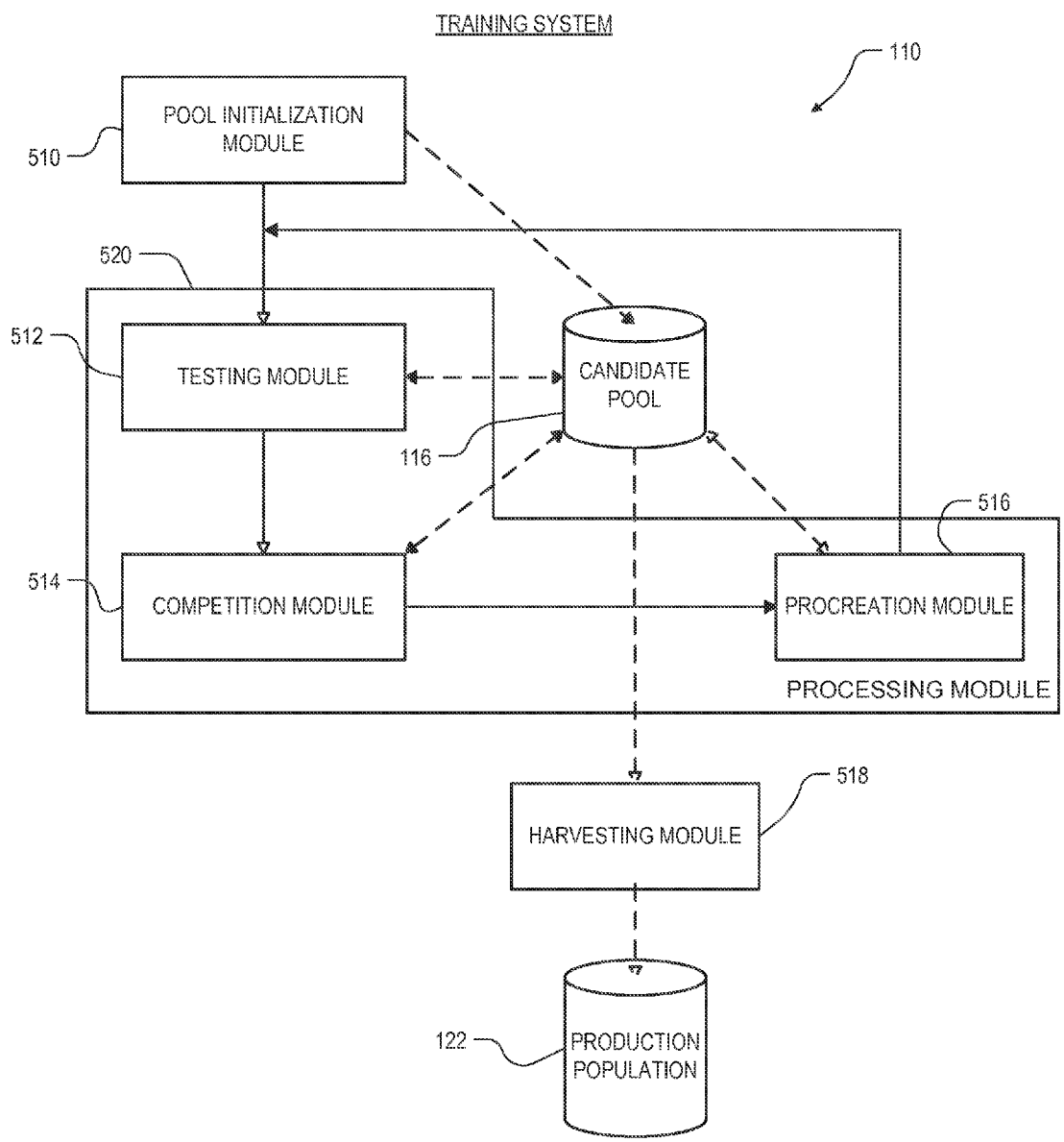
FIG. 5 illustrates modules that can be used to implement the functionality of the training system in FIG. 1.

FIG. 5 illustrates various modules that can be used to implement the functionality of training system 110 (FIG. 1). Candidate pool 116 and production population database 122 are also shown in the drawing. Solid lines indicate process flow, and broken lines indicate data flow. The modules can be implemented in hardware or software, and need not be divided up in precisely the same blocks as shown in FIG. 5. Some can also be implemented on different processors or computers, or spread among a number of different processors or computers. In addition, it will be appreciated that some of the modules can be combined, operated in parallel or in a different sequence than that shown in FIG. 5 without affecting the functions achieved. Also as used herein, the term "module" can include "sub-modules", which themselves can be considered herein to constitute modules. In particular, the candidate testing module 512, competition module 514, and procreation module 516 are also considered herein to be sub-modules of a candidate pool processor module 520. The blocks in FIG. 5 designated as modules can also be thought of as flowchart steps in a method.

Referring to FIG. 5, the candidate pool 116 is initialized by pool initialization module 510, which creates an initial set of candidate individuals in $L_0$ of the candidate pool 116. These individuals can be created randomly, or in some embodiments a priori knowledge is used to seed the first generation. In another embodiment, individuals from prior runs can be borrowed to seed a new run. At the start, all individuals are initialized with an experience level of zero and a fitness estimate that is undefined. As mentioned, newly created individuals are required to satisfy certain minimum conditions, such as completeness. In the financial asset trading domain, completeness may include a requirement that each individual include at least one rule that enters a position and at least one rule that exits a position. An individual that does not meet the minimum conditions either is never created by whatever algorithm is used to create new individuals, or is discarded promptly upon creation.

In an embodiment, there is no a priori requirement on what labels (if any) are indicated in outputs of the rules in an individual, nor is there any a priori requirement on what labels are included in the conditions of the rule. In another embodiment, the only requirement is a maximum label number $LBL_{Max}$, for example $LBL_{Max}=5$. That is, only labels LBL1 through $LBL_{Max}$ are available to populate a rule. Various embodiments permit a given label to be indicated in the outputs of more than one rule in an individual, and permit a given label to be omitted entirely from all the rules in an individual. In some embodiments, a wildcard label is permitted in the conditions. A wildcard label, sometimes referred to herein as LBL0, will match all labels $LBL1$-$LBL_{Max}$. Thus if LBL0 is indicated in the output of an entry rule, then the resulting entry position entry 328 in status record 326 will match a fired exit rule regardless of which label is indicated in the output of the exit rule. Similarly, if LBL0 is indicated in the output of an exit rule, then all entries 328 in status record 326 for the same security will match regardless of the label indicated in the entry 328. As used herein, a "wildcard label" matches all other label values, whereas a "definite label" is a label that identifies only a single value. A "definite label" matches only another label that identifies the same value, or a wildcard label. Note that another embodiment may support various kinds of partial wildcards, such as wildcards that match certain kinds of definite labels but not other kinds of definite labels. The term "matching", as used herein, accommodates the effect of wildcards. A special case of "matching", sometimes referred to herein as "exact matching", occurs when two labels are equal to each other.

Candidate testing module 512 then proceeds to test the population in the candidate pool 116 on the training data 114. For the reasons explained above, only those individuals that have not yet reached the top layer $L_T$ of the elitist pool 118 (of which there are none initially) are tested. Each individual undergoes a battery of tests or trials on the training data 114, each trial testing the individual on one sample 410. In one embodiment, each battery might consist of only a single trial. Preferably, however, a battery of tests is much larger, for example on the order of 1000 trials. In one embodiment, at least the initial battery of tests includes at least $ExpMin(L_1)$ trials for each individual, to enable the initial individuals to qualify for consideration for the first layer of the elitist pool 118. Note there is no requirement that all individuals undergo the same number of trials. After the tests, candidate testing module 512 updates the fitness estimate associated with each of the individuals tested.

In an embodiment, the fitness estimate may be an average of the results of all trials of the individual. In this case the "fitness estimate" can conveniently be indicated by two numbers: the sum of the results of all trials of the individual, and the total number of trials that the individual has experienced. The latter number may already be maintained as the experience level of the individual. The fitness estimate at any particular time can then be calculated by dividing the sum of the results by the experience level of the individual. In an embodiment such as this, "updating" of the fitness estimate can involve merely adding the results of the most recent trials to the prior sum.

Next, competition module 514 updates the candidate pool 116 contents in dependence upon the updated fitness estimates. The operation of module 514 is described in more detail below, but briefly, the module considers individuals from lower layers for promotion into higher layers, discards individuals that do not meet the minimum individual fitness of their target layer, and discards individuals that have been replaced in a layer by new entrants into that layer. Candidate pool 116 is updated with the revised contents.

After the candidate pool 116 has been updated, a procreation module 516 evolves a random subset of them. Only individuals in the elitist pool are permitted to procreate. Any conventional or future-developed technique can be used for procreation. In an embodiment, conditions, outputs (including both actions and labels), or rules from parent individuals are combined in various ways to form child individuals, and then, occasionally, they are mutated. The combination process for example may include crossover—i.e., exchanging conditions, actions, labels, or entire rules between parent individuals to form child individuals. New individuals created through procreation begin with an experience level of zero and with a fitness estimate that is undefined. These individuals are placed in $L_0$ of the candidate pool 116.

Preferably, after new individuals are created by combination and/or mutation, the parent individuals are retained. In this case the parent individuals also retain their experience level and fitness estimates, and remain in their then-current elitist pool layers. In another embodiment, the parent individuals are discarded.

It can be seen that there may be no apparent rhyme or reason why a particular individual evolves to indicate certain labels in its rule outputs or rule conditions. Elsewhere herein the label in the output of an entry rule is said to identify the "reason" why a position was entered (if that rule fires and its action is executed), and in that sense the label is merely a name for the "reason". This is one way to interpret the choice of labels that the evolutionary process made, but more precisely it identifies the set of conditions in the rule or rules that triggered the action. And in an embodiment in which more than one rule in an individual can evolve to identify the same output label, labels might also be thought of as referring to a class of "reasons" rather than a single "reason" defined by the specific conditions of a single rule. And the granularity of the classification can be influenced, in part, by the maximum number $LBL_{Max}$ of labels that an individual is permitted to use.

Regardless of the name or interpretation given to the value 324 identified in the output of a rule along with the action, it can be seen that the availability of that value in an action provides an additional degree of freedom through which an individual can take into account how a position was entered when deciding when to exit. This offers new capabilities for individuals to evolve which detect and make use of patterns which it finds in data mining the training data.

After procreation, candidate testing module 512 operates again on the updated candidate pool 116. The process continues repeatedly.

Sometime after the top layer of elitist pool 118 is full, individuals can be harvested for use by production system 112. Harvesting module 518 retrieves individuals for that purpose. In one embodiment, harvesting module 518 retrieves individuals periodically, whereas in another embodiment it retrieves individuals only in response to user input. Harvesting module 518 selects only from the top layer $L_T$, and can apply further selection criteria as well in order to choose desirable individuals. For example, it can select only the fittest individuals from $L_T$, and/or only those individuals that have shown low volatility. Other criteria will be apparent to the reader. The individuals also undergo further validation as part of this further selection criteria, by testing on historical data not part of training data 114. The individuals selected by the harvesting module 518 are written to the production population database 122 for use by production system 112 as previously described.

Candidate Testing Module 512.

Figure 10:
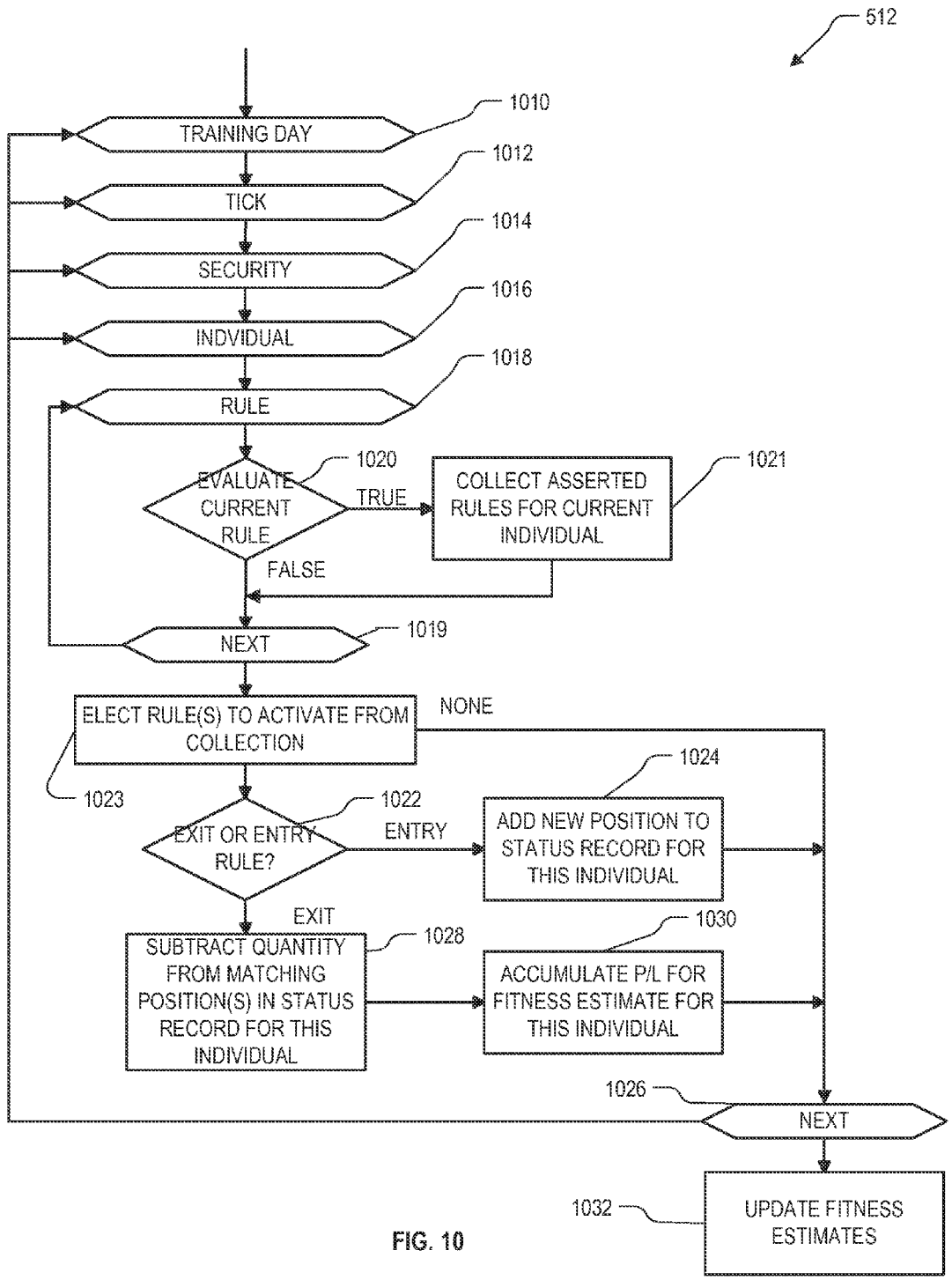
FIG. 10 is a flow chart detail illustrating pertinent parts of the operation of candidate testing module of FIG. 5 in example embodiment.

FIG. 10 is a flow chart detail illustrating pertinent parts of the operation of candidate testing module 512 in an example embodiment. It includes five nested loops. These loops can be performed in any nesting order, and preferably several of them are performed in parallel rather than in sequence. In step 1010, a loop begins through the different days of data in the training data 114. In this embodiment, individuals are arranged so that they enter and exit positions all within a single day, and their fitness is updated at the end of each day of data. A day of tick data is considered a single data sample.

In step 1012, a loop begins through each tick (time point at which prices are known) in the current day of data, and in step 1014 another loop begins through all of the securities in the portfolio. In step 1016, another loop begins through all the individuals of candidate pool 116 which are to be tested in the current battery of tests. In step 1018, another loop begins through all the rules in the current individual.

In step 1020 the current rule is evaluated for the current security against the tick data of the current sample day. If it evaluates to FALSE, then in step 1019 the routine loops back to step 1018, to consider the next rule in the current individual. If it evaluates to TRUE, then in step 1021 the candidate testing module 512 collects the asserted rule (or in some embodiments only the asserted action and corresponding label) in a temporary memory for the individual. After all the rules for the current individual have been evaluated, in step 1023 the module 512 determines whether any rules were asserted. If not, then in step 1026 the routine loops back to step 1016, 1014, 1012 or 1010 to consider the next individual, security, tick or sample day, as the case may be for the current nesting level.

Whereas in another embodiment more than one asserted rule can be activated, in the embodiment of FIG. 10, only one asserted rule is activated. If the collection contains more than one asserted rule (i.e. more than one rule of the current individual, security, tick and training day fired), then in step 1023 an election is made among all the asserted rules. A variety of different strategies can be used for the election in different embodiments. In one embodiment, the rules of an individual are assigned an order, and the lowest order rule that fired is activated. In another embodiment, it is the highest order rule that fired. In another embodiment, each of the rules output not only an action and label, but also a firing strength or confidence value, and the fired rule asserting the greatest strength or confidence value is activated. Any desired sub-strategy can be used to resolve a tie. In yet another embodiment, the range of permitted rule actions is classified into N classifications, and the fired rule to activate is elected from the classification with maximum number of fired rules. Again, any desired sub-strategy can be used to resolve a tie. In an example of this last embodiment, in a financial asset trading environment, rule actions may be limited to the following four action classifications: Buy, Short, Long Exit, and Short Exit. Buy and Short are Entering actions, whereas Long Exit and Short Exit are exiting actions. In this example step 1023 determines which of the four classifications had the greatest number of fired rules, and the fired rule with the lowest order in the individual and which has that action classification is the one that is activated. Many other variations will be apparent.

In step 1022 it is determined whether the elected rule is an entry rule or an exit rule. If it is an entry rule, then in step 1024 a new position 328 is added to the status record 326 for the current individual. The new position identifies the current security, the label output of the current rule, and the quantity, among other things. The routine then continues to step 1026 to continue the nested loops. If the current rule is an exit rule, then in step 1028 a search is made of the current individual's status record 326 for matching positions. As mentioned, both the security and the label of a position must match that of the rule's output if any action is to be taken. If one or more matching positions are found, then the quantity indicated in the output of the current rule is subtracted from the quantity in the record 326.

More specifically, if the status record 326 indicates sufficient numbers of shares in the position to be exited, then the number of shares indicated in the relevant position 328 is reduced by the quantity that is to be exited. If this leaves a position with zero quantity, then the position can be deleted. If the status record contains more than one position 328 which matches the security and label of the current exit rule, then the quantity in the oldest position is reduced first, followed by the quantity in the next more recent position, and so on until the exiting quantity is exhausted. (Other sequences of quantity reduction can be implemented in other embodiments.) If the status record positions 328 do not collectively indicate matching positions with a sufficient quantity of shares to satisfy the exit quantity, then only the quantity that the status record does contain is exited. If the status record 326 contains no entries that match the security and label indicated by the current exit rule, then no positions are exited and no changes are made to the individual's status record.

In step 1030, if any changes were made to the individual's status record, the training system 110 accumulates any profit or loss into a fitness estimate for the individual for the current training day. The routine then continues to step 1026 to continue the nested loops. After all the loops complete, in step 1032 the training system 110 updates the fitness estimates for all the individuals tested.

Competition Module 514.

As mentioned, competition module 514 manages the graduation of individuals from lower layers in the candidate pool 116, up to higher layers. This process can be thought of as occurring one individual at a time, as follows. First, a loop is begun through all individuals whose experience level has changed since the last time competition module 514 was executed. If the current individual's experience level has not increased sufficiently to qualify it for the next experience layer in the elitist pool 118, then the individual is ignored and the next one is considered. If the current individual's experience level has increased sufficiently to qualify it for a new experience layer, then the module 514 determines whether the target experience layer is already at quota. If not, then the individual is simply moved into that experience level. If the target layer is full, then the competition module 514 determines whether the fitness estimate of the current individual exceeds that of the least fit individual in the target layer. If so, then the least fit individual is discarded, and the current individual is moved up into the target layer. If not, then the current individual is discarded. The process then moves on to consider the next individual in sequence. Note that while individuals typically move up by only one experience layer at a time, that is not requirement in all embodiments. In some embodiments, such as in a client/server embodiment, it may happen that a particular individual is not considered for advancement within the elitist pool 118 until after its experience level has increased sufficiently for it to jump past one or more experienced layers.

In an embodiment that enforces an elitist pool minimum fitness, the step in which the fitness estimate of the current individual is compared to the minimum fitness of the target layer, can further include a test of whether the current individual's fitness estimate satisfies the elitist pool minimum fitness. Typically this latter test is applied only on individuals graduating out of level 0, but as mentioned previously, could be applied to individuals being considered for other layers in the elitist pool 118 as well. If the current individual does not satisfy the elitist pool minimum fitness, then it is discarded.

The above routine processes individuals sequentially, and different embodiments can implement different sequences for processing the individuals. Note that the processing sequence can affect the results if, for example, an individual in layer $L_i$ is being considered for layer $L_{i+1}$ at the same time that an individual in layer $L_{i-1}$ is being considered for layer $L_i$. If the former test occurs first, then a hole will be opened in layer $L_i$ and the individual graduating from layer $L_{i-1}$ will be promoted into layer $L_i$ automatically. If the latter test occurs first, then the individual graduating from layer $L_{i-1}$ will have to compete for its place in layer $L_i$ (assuming layer $L_i$ is at quota). In another embodiment, individuals are considered layer by layer either according to their target layer after promotion, or according to their current layer prior to promotion. Again, the sequence of individuals to consider within each layer will depend on the embodiment, as will the sequence in which the layers themselves are considered.

Figure 6:
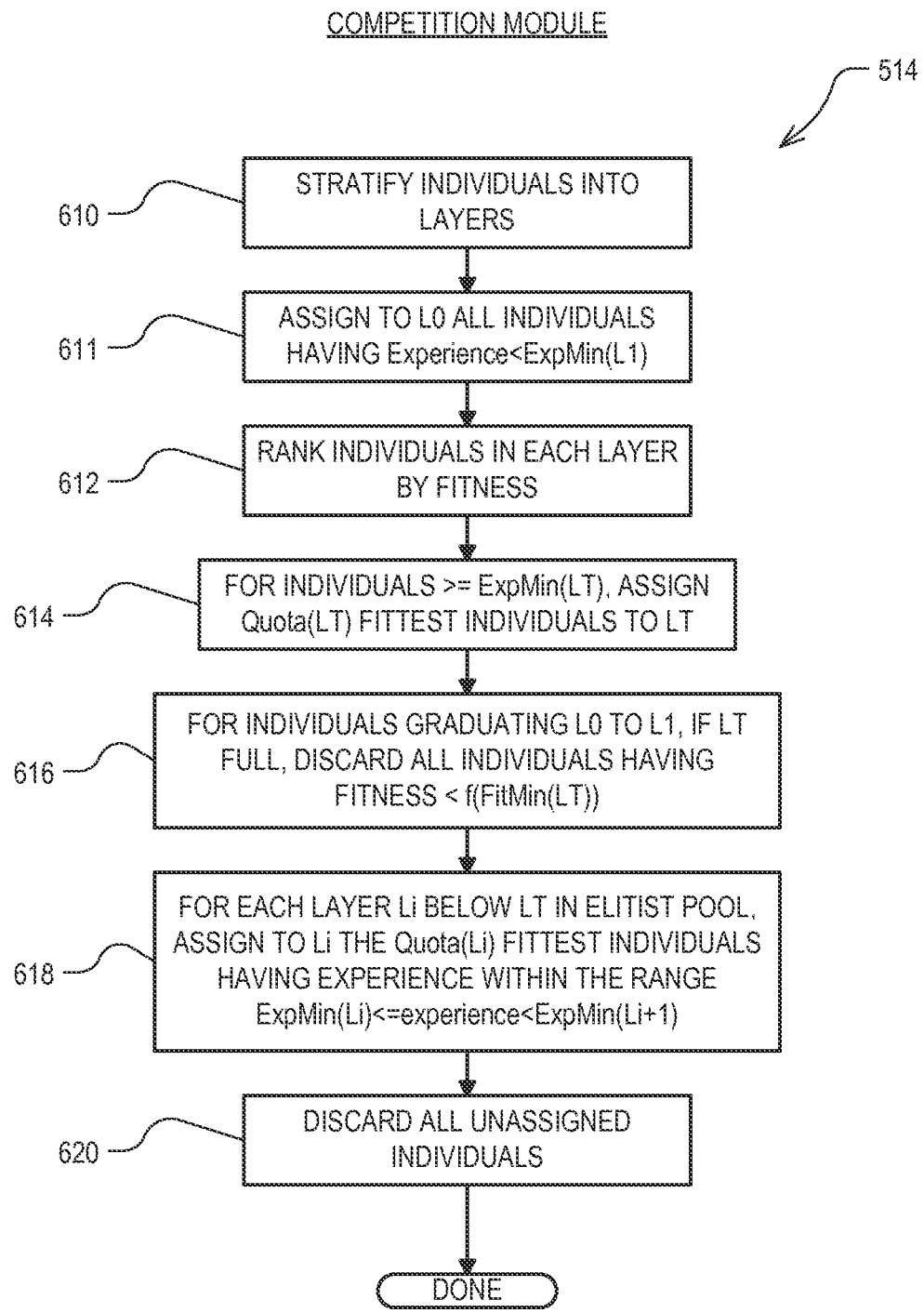
FIG. 6 illustrates a method of operation of the competition module in FIG. 5.

FIG. 6 illustrates a bulk-oriented method of operation of competition module 514. In the embodiment of FIG. 6, the layers in the candidate pool 116 are disbanded and reconstituted each time the competition module 514 executes. These executions of competition module 514 are sometimes referred to herein as competition "events", and each comparison made between the fitness estimate of one individual and that of another is sometimes referred to herein as a comparison "instance". As with all flow diagrams herein, it will be appreciated that many of the steps can be combined, performed in parallel or performed in a different sequence without affecting the functions achieved. In some cases, as the reader will appreciate, a re-arrangement of steps will achieve the same results only if certain other changes are made as well. In other cases, as the reader will appreciate, a re-arrangement of steps will achieve the same results only if certain conditions are satisfied. Furthermore, it will be appreciated that the flow charts herein show only steps that are pertinent to an understanding of the invention, and it will be understood that numerous additional steps for accomplishing other functions can be performed before, after and between those shown.

In step 610, all the individuals in candidate pool 116 are stratified into their experience layers. In step 611, all individuals whose experience level is still within that of $L_0$, are assigned automatically to $L_0$. In step 612, within each experience layer $L_1$-$L_T$, the individuals are ranked according to their fitness estimates. In step 614, of those individuals whose experience level is at least equal to the minimum experience level of the top layer of the elitist pool 118, the Quota($L_T$) fittest are assigned to $L_T$. Note that this step could exclude some individuals with top layer experience, as individuals coming up from layer $L_{T-1}$ can supplant less fit individuals that were previously in $L_T$.

As used herein, a phrase such as "only the five fittest individuals", need not necessarily fill all five places. That is, if there are only three individuals to consider, the phrase is satisfied if all three individuals are assigned places. Thus it can be seen that step 618 includes both a policy that individuals entering a layer that is already at quota must compete for their place in that layer, as well as a policy that individuals entering a layer that is not yet full are promoted to that layer automatically. It can also be seen that steps 618 and 620 together implement a policy that fitness comparisons are made only among individuals having roughly the same experience.

Step 616 implements the policy that once $L_T$ is full, no individuals are allowed into the elitist pool 118 unless they are at least as fit as some predetermined function f( ) of the top layer minimum fitness. In step 616, therefore, if $L_T$ is full, all individuals graduating from $L_0$ to $L_1$ whose fitness estimate is less than f(FitMin($L_T$)) are discarded. Variations of step 616 to implement variations of the elitist pool minimum fitness policy, will be apparent. In step 618, for each layer $L_i$ below the top layer $L_T$, all the individuals in the elitist pool 118 having experience level within the range associated with layer $L_i$ are considered. Of these individuals, only the Quota($L_i$) fittest individuals are assigned to layer $L_i$. In step 620, all individuals remaining in elitist pool 118 which were not assigned to specific layers in steps 611, 614 or 618, are discarded.

Procreation Module 516.

Figure 11:
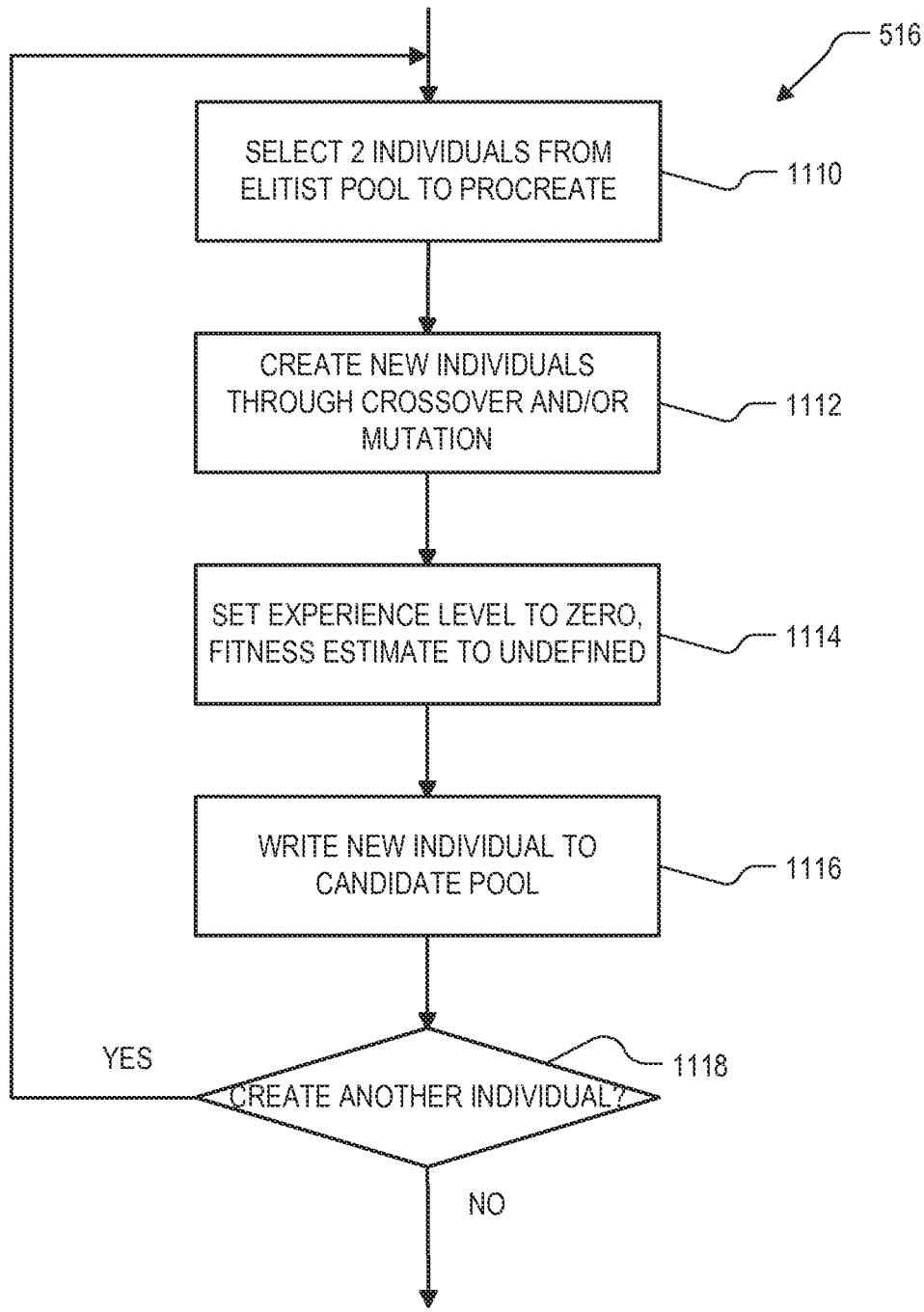
FIG. 11 is a flow chart detail of pertinent steps performed by the procreation module of FIG. 5 in an example embodiment.

FIG. 11 is a flow chart detail of pertinent steps performed by the procreation module 516. In step 1110, the training system 110 selects two individuals from the elitist pool to procreate. In step 1112 a new individual is created from the two parents through such techniques as crossover and/or mutation. In particular, in the embodiment of FIG. 5, a new individual contains rules, conditions, output actions and output labels. Some of those may come from one parent and others may come from a different parent, and still others may come from neither parent (i.e. a mutation). As particular examples, a new individual may contain one entire rule from one parent (including its output label) and another entire rule (including its output label) from another parent. A new individual may contain a rule from one parent, in which one or more conditions, output actions or output labels are replaced by one from a rule in a different parent. A new individual may contain a rule from one parent, in which one or more conditions, output actions or output labels are replaced by a new one created for the purpose of the procreation. Other variations will be apparent.

In step 1114, the experience level of the new individual is set to zero, and its fitness is set to undefined. In step 1116 the new individual is written into candidate pool 116. In step 1118 it is determined whether more individuals are to be created, and if so, then the procreation module 516 returns to step 1110 to create the next one.

Production System 112.

Figure 12:
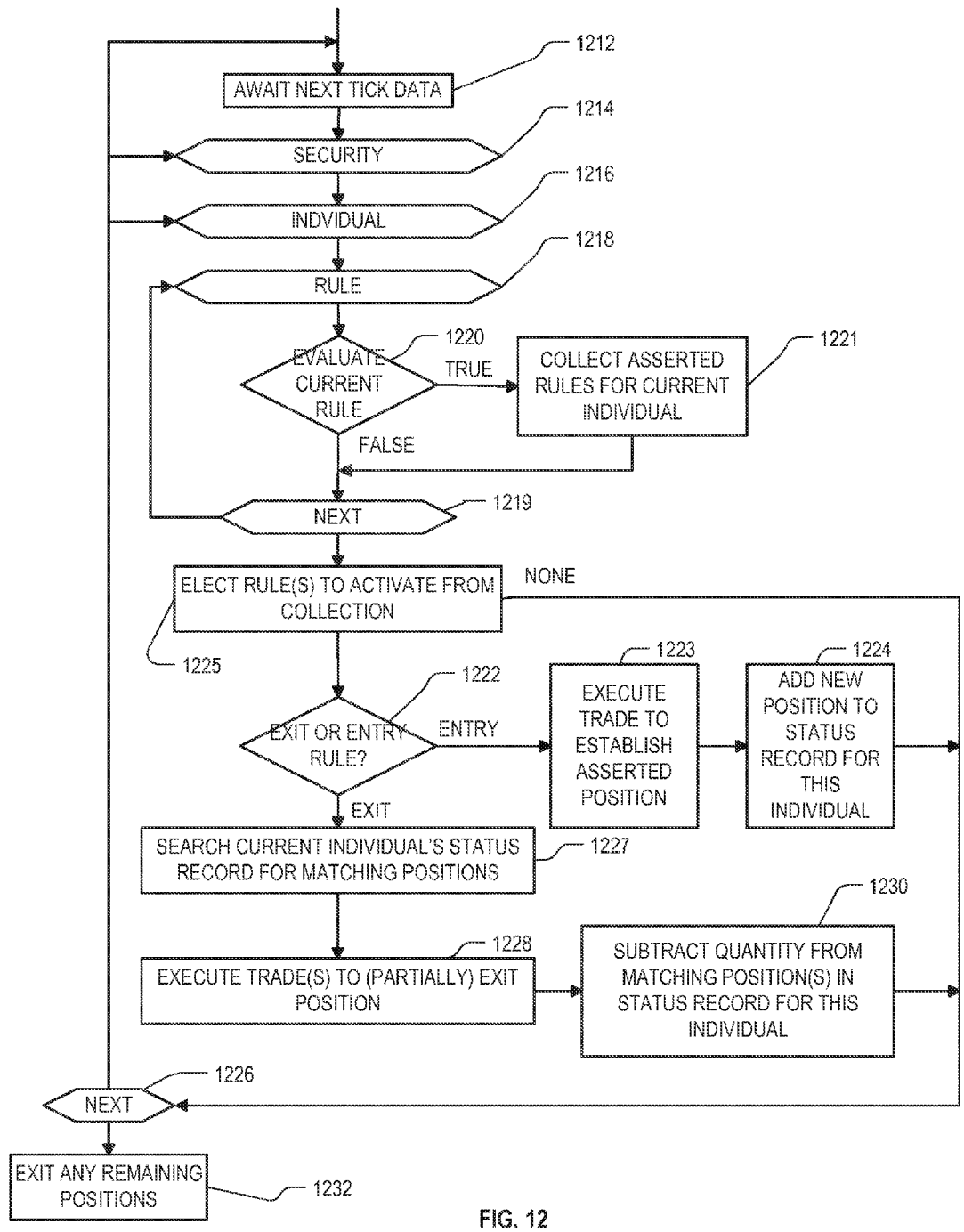
FIG. 12 is a flow chart detail illustrating the operation of pertinent aspects of the production system of FIG. 1 in an example embodiment.

The operation of production system 112 bears many similarities with that of the candidate testing module 512 in FIG. 5, except that it operates on real time data, real trades are executed, and fitness and experience levels are no longer maintained or estimated. FIG. 12 is a flow chart detail illustrating the operation of pertinent aspects of production system 112 in an example embodiment. In step 1212, production system first awaits the next tick in the incoming data stream. The system then enters three nested loops. These loops can be performed in any nesting order, and preferably several of them are performed in parallel rather than in sequence. In step 1214 a loop begins through all of the securities in the portfolio. In step 1216, another loop begins through all the individuals of production population database 122. In step 1218, another loop begins through all the rules in the current individual.

In step 1220 the current rule is evaluated for the current security against the current tick data (which can include historical data for the current day). If it evaluates to FALSE, then in step 1219 the routine loops back to step 1218, to consider the next rule in the current individual. If it evaluates to TRUE, then in step 1221 the production system 112 collects the asserted rule in a temporary memory for the individual. After all the rules for the current individual have been evaluated, in step 1225 the production system 112 determines whether any rules were asserted. If not, then in step 1226 the routine loops back to step 1216, 1214 or 1212 to continue the nested loops. If the collection contains more than one asserted rule (i.e. more than one rule of the current individual and security fired for the current tick data), then in step 1225 an election is made among all the asserted rules. Any of the strategies set forth above with respect to FIG. 10 can be used for this election in different embodiments, the caveat being that the strategy used in step 1225 is the same as the strategy that was used in the training.

In step 1022 it is determined whether the elected rule is an entry rule or an exit rule. If it is an entry rule, then in step 1223, assuming all other filters are satisfied, trades are executed in order to establish the position asserted by the rule output. In step 1224, a new position 328 is added to the status record 326 for the current individual. The new position identifies the current security, the label output of the current rule, and the quantity, among other things. The routine then continues to step 1226 to continue the nested loops. If the current rule is an exit rule, then in step 1227, again assuming all other filters are satisfied, a search is made of the current individual's status record 326 for matching positions. As mentioned, both the security and the label of a position must match that of the rule's output if any action is to be taken. If one or more matching positions are found, then in step 1228 trades are executed in order to exit or partially exit positions as asserted in the rule's output.

Then, in step 1230, the quantity of the position successfully exited in step 1228 is subtracted from the quantity in the record 326. All the variations and considerations set forth above with respect to step 1028 (FIG. 10) apply here as well. The routine then continues to step 1226 to continue the nested loops. After all the loops complete, in step 1232 any positions remaining at the end of the trading day are exited.

Typical Sequence of Entries and Exits.

The following is a typical example sequence of position entries and exits that an individual might generate using aspects of the invention. This sequence can occur during training or during production, except that during training all exits and entries are only simulated. FIGS. 13A-H (collectively FIG. 13) illustrate the contents of the individual's status record at various points in this sequence.

Individual's entry rule 1 fires, asserts to buy 1000 shares of IBM, label LBL1.
1000 shares of IBM are purchased
Add Position 1 to individual's status record indicating the current tick, IBM, 1000, LBL1. See FIG. 13A.
Individual's entry rule 2 fires, asserts to buy 1000 shares of IBM, label LBL2.
1000 more shares of IBM are purchased
Add Position 2 to individual's status record indicating the current tick, IBM, 1000, LBL2. See FIG. 13B
Individual's entry rule 1 fires again, asserts to buy 1000 shares of IBM, label LBL1.
1000 shares of IBM are purchased
Add Position 3 to individual's status record indicating the current tick, IBM, 1000, LBL1. See FIG. 13C.
Individual's exit rule 3 fires, asserts to sell 500 shares of IBM, label LBL3.
No action taken, because status record has no positions with label LBL3.
Individual's exit rule 4 fires, asserts to sell 600 shares of IBM, label LBL2.
600 shares of IBM are sold
Quantity in Position 2 is reduced by 600 to 400, because Position 2 is the only position identifying IBM and label LBL2. See FIG. 13D.
Individual's exit rule 5 fires, asserts to sell 700 shares of IBM, label LBL1.
700 shares of IBM are sold
Quantity in Position 1 is reduced by 700 to 300, because Position 1 is the earliest position identifying IBM and label LBL1, and it contains sufficient quantity to cover the sale quantity. See FIG. 13E.
Individual's exit rule 5 fires again, asserts to sell 700 shares of IBM, label LBL1.
700 shares of IBM are sold Quantity in Position 1 is reduced by 300 to zero, because Position 1 is the earliest position identifying IBM and label LBL1. Though not shown, Position 1 may now be deleted entirely from status record 326.

Quantity in Position 3 is reduced by 400 to 600, because Position 3 is the only remaining position identifying IBM and label LBL1. See FIG. 13F.

Individual's exit rule 4 fires again, asserts to sell 600 shares of IBM, label LBL2.

Only 400 shares of IBM are sold, since total quantity in all positions identifying IBM and label LBL2 is only 400.

Quantity in Position 2 is reduced by 400 to zero, because Position 2 is the only position identifying IBM and label LBL2. See FIG. 13G. Though not shown, Position 2 may now be deleted entirely from status record 326.

Individual's exit rule 5 fires again, asserts to sell 700 shares of IBM, label LBL1.

Only 600 shares of IBM are sold, since total quantity in all positions identifying IBM and label LBL1 is only 600.

Quantity in Position 3 is reduced by 600 to zero, because Position 3 is the only remaining position identifying IBM and label LBL1. See FIG. 13H.

Figure 7:
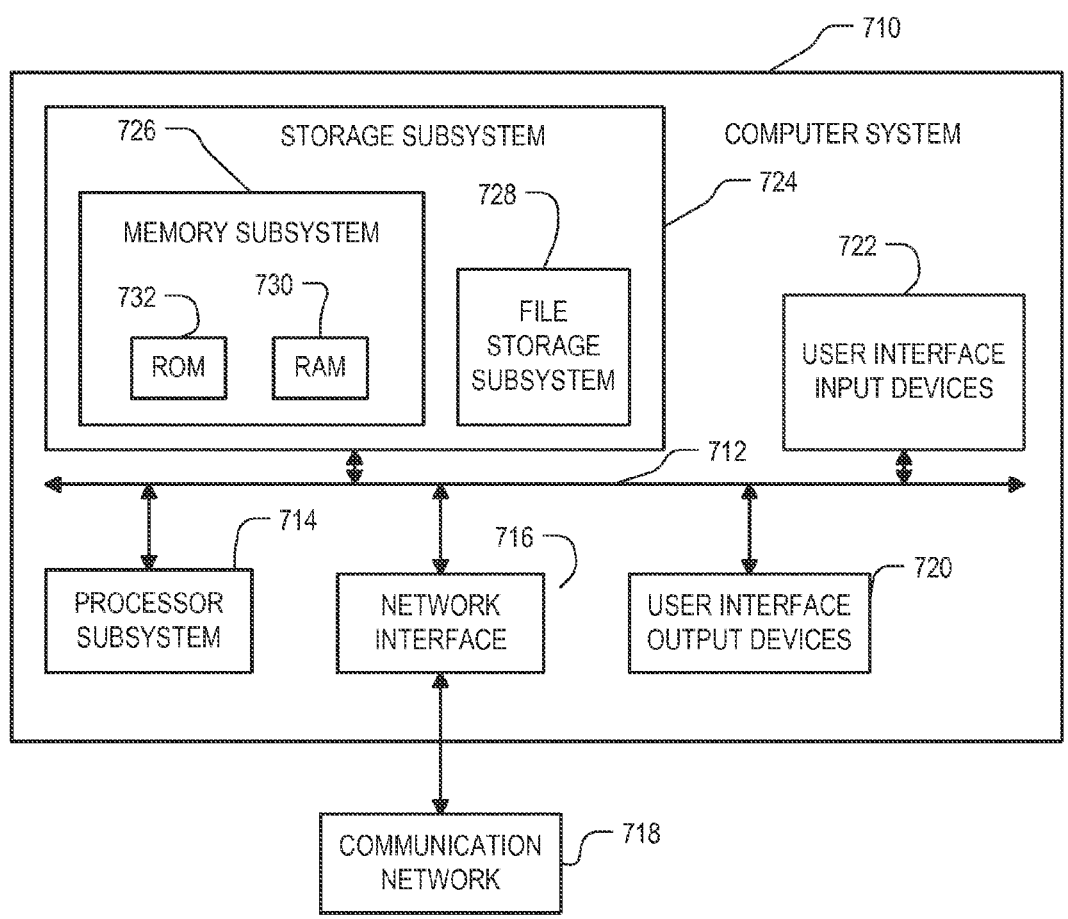
FIG. 7 is a simplified block diagram of a computer system that can be used to implement either or both of the training system or production system in FIG. 1, and/or the training server and clients in FIG. 8.

FIG. 7 is a simplified block diagram of a computer system 710 that can be used to implement training system 110, production system 112, or both. While FIGS. 1, 5, 6 and 9 indicate individual components for carrying out specified operations, it will be appreciated that each component actually causes a computer system such as 710 to operate in the specified manner.

Computer system 710 typically includes a processor subsystem 714 which communicates with a number of peripheral devices via bus subsystem 712. These peripheral devices may include a storage subsystem 724, comprising a memory subsystem 726 and a file storage subsystem 728, user interface input devices 722, user interface output devices 720, and a network interface subsystem 716. The input and output devices allow user interaction with computer system 710. Network interface subsystem 716 provides an interface to outside networks, including an interface to communication network 718, and is coupled via communication network 718 to corresponding interface devices in other computer systems. Communication network 718 may comprise many interconnected computer systems and communication links. These communication links may be wireline links, optical links, wireless links, or any other mechanisms for communication of information. While in one embodiment, communication network 718 is the Internet, in other embodiments, communication network 718 may be any suitable computer network.

The physical hardware component of network interfaces are sometimes referred to as network interface cards (NICs), although they need not be in the form of cards: for instance they could be in the form of integrated circuits (ICs) and connectors fitted directly onto a motherboard, or in the form of macrocells fabricated on a single integrated circuit chip with other components of the computer system.

User interface input devices 722 may include a keyboard, pointing devices such as a mouse, trackball, touchpad, or graphics tablet, a scanner, a touch screen incorporated into the display, audio input devices such as voice recognition systems, microphones, and other types of input devices. In general, use of the term "input device" is intended to include all possible types of devices and ways to input information into computer system 710 or onto computer network 718.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 710 to the user or to another machine or computer system. In particular, an output device of the computer system 710 on which production system 112 is implemented, may include a visual output informing a user of action recommendations made by the system, or may include a communication device for communicating action signals directly to the controlled system 128. Additionally or alternatively, the communication network 718 may communicate action signals to the controlled system 128. In the financial asset trading environment, for example, the communication network 718 transmits trading signals to a computer system in a brokerage house which attempts to execute the indicated trades.

Storage subsystem 724 stores the basic programming and data constructs that provide the functionality of certain embodiments of the present invention. For example, the various modules implementing the functionality of certain embodiments of the invention may be stored in storage subsystem 724. These software modules are generally executed by processor subsystem 714. Storage subsystem 724 also stores the candidate pool 116, the training database 114, and/or the production population 122, including individuals and their associated status records 326. Alternatively, one or more of such databases can be physically located elsewhere, and made accessible to the computer system 710 via the communication network 718.

Memory subsystem 726 typically includes a number of memories including a main random access memory (RAM) 730 for storage of instructions and data during program execution and a read only memory (ROM) 732 in which fixed instructions are stored. File storage subsystem 728 provides persistent storage for program and data files, and may include a hard disk drive, a floppy disk drive along with associated removable media, a CD ROM drive, an optical drive, or removable media cartridges. The databases and modules implementing the functionality of certain embodiments of the invention may have been provided on a computer readable medium such as one or more CD-ROMs, and may be stored by file storage subsystem 728. The host memory 726 contains, among other things, computer instructions which, when executed by the processor subsystem 714, cause the computer system to operate or perform functions as described herein. As used herein, processes and software that are said to run in or on "the host" or "the computer", execute on the processor subsystem 714 in response to computer instructions and data in the host memory subsystem 726 including any other local or remote storage for such instructions and data.

Bus subsystem 712 provides a mechanism for letting the various components and subsystems of computer system 710 communicate with each other as intended. Although bus subsystem 712 is shown schematically as a single bus, alternative embodiments of the bus subsystem may use multiple busses.

Computer system 710 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 710 depicted in FIG. 7 is intended only as a specific example for purposes of illustrating the preferred embodiments of the present invention. Many other configurations of computer system 710 are possible having more or less components than the computer system depicted in FIG. 7.

Client/Server Embodiment

In some environments, the training data used to evaluate an individual's fitness can be voluminous. Therefore, even with modern high processing power and large memory capacity computers, achieving quality results within a reasonable time is often not feasible on a single machine. A large candidate pool also requires a large memory and high processing power. In one embodiment, therefore, a client/server model is used to provide scaling in order to achieve high quality evaluation results within a reasonable time period. Scaling is carried out in two dimensions, namely in pool size as well as in evaluation of the same individual to generate a more diverse candidate pool so as to increase the probability of finding fitter individuals. In the client/server embodiment, the candidate pool is distributed over a multitude of clients for evaluation. Each client continues to evaluate its own client-centric candidate pool using data from training database 114, which it may receive in bulk or periodically on a sustained and continuing basis. Individuals that satisfy one or more predefined conditions on a client computer are transmitted to the server to form part of a server-centric candidate pool.

Distributed processing of individuals also may be used to increase the speed of evaluation of a given individual. To achieve this, individuals that are received by the server but have not yet been tested on a certain number of samples, or have not yet met one or more predefined conditions, may be sent back from the server to a multitude of clients for further evaluation. The evaluation result achieved by the clients (alternatively called herein as partial evaluation) for an individual is transferred back to the server. The server merges the partial evaluation results of an individual with that individual's fitness estimate at the time it was sent to the clients to arrive at an updated fitness estimate for that individual in the server-centric candidate pool. For example, assume that an individual has been tested on 500 samples and is sent from the server to, for example, two clients each instructed to test the individual on 100 additional samples. Accordingly, each client further tests the individual on the additional 100 samples and reports its own client-centric fitness estimate to the server. The server combines these two estimates with the individual's fitness estimate at the time it was sent to the two clients to calculate an updated server-centric fitness estimate for the individual. The combined results represent the individual's fitness evaluated over 700 days. In other words, the distributed system, in accordance with this example, increases the experience level of an individual from 500 samples to 700 samples using only 100 different training samples at each client. A distributed system, in accordance with the present invention, is thus highly scalable in evaluating its individuals.

Advantageously, clients are enabled to perform individual procreation locally, thereby improving the quality of their individuals. Each client is a self-contained evolution device, not only evaluating the individuals in its own pool, but also creating a new generation of individuals and moving the evolutionary process forward locally. Thus clients maintain their own client-centric candidate pool which need not match each other's or the server-centric candidate pool. Since the clients continue to advance with their own local evolutionary process, their processing power is not wasted even if they are not in constant communication with the server. Once communication is reestablished with the server, clients can send in their fittest individuals to the server and receive additional individuals from the server for further testing.

Figure 8:
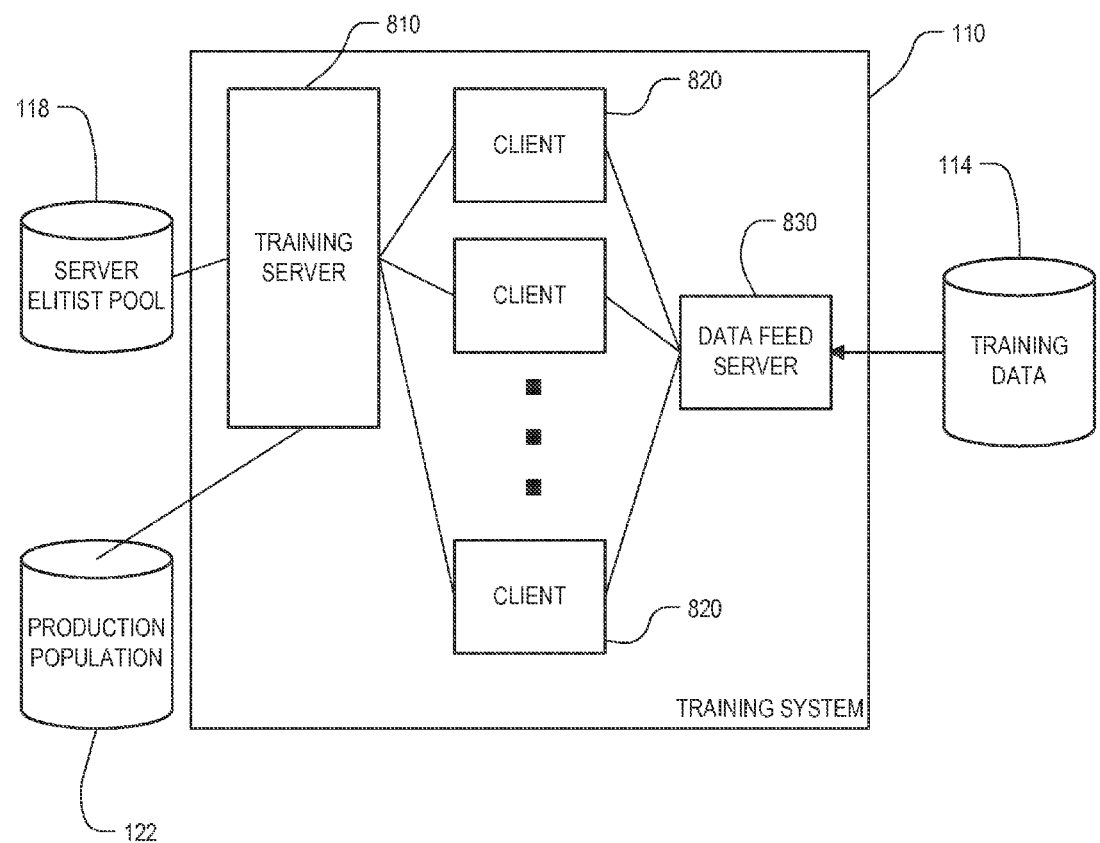
FIG. 8 is a high-level block diagram of an example embodiment of the training system of FIG. 1 using a network computing system.

FIG. 8 is a high-level block diagram of an example embodiment of training system 110 implemented using a network computing system. The training system 110 includes a plurality of client computers 820 (sometimes referred to herein simply as "clients") and a training server computer 810. Server 810 may itself be a central or a distributed server. A client computer 820 may be a laptop computer, a desktop computer, a cellular/VoIP handheld computer or smart phone, a tablet computer, distributed computer, or the like. An example system may have hundreds of thousands of clients. In an embodiment, the training server and/or each of the client computers can have the structure of FIG. 7, or any of its variations as described above. The client computers 820 communicate with the training sever 810 to receive individuals for testing, and to report tested individuals back to the training server 810. The training server 810 maintains a server-centric experience-layered elitist pool 118, but in an embodiment, does not maintain any candidate individuals below layer $L_1$ of the elitist pool. New individuals are created by clients, both during initialization and by procreation, and they are not reported to the training server 810 until they have been tested on sufficient numbers of samples to qualify for the server's elitist pool 118. The number of individuals created by the clients 820 may vary depending on the memory size and the CPU processing power of the client. For example, in one embodiment, a client may have 1000 individuals for evaluation. Each client computer 820 further has a communication port to access one or more data feed servers 830, which retrieve and forward training samples from the training database 114 to the client computers 820. Alternatively, although not shown, the training samples may be supplied from data feed server 830 to the clients 820 via the training server 810.

Figure 9:
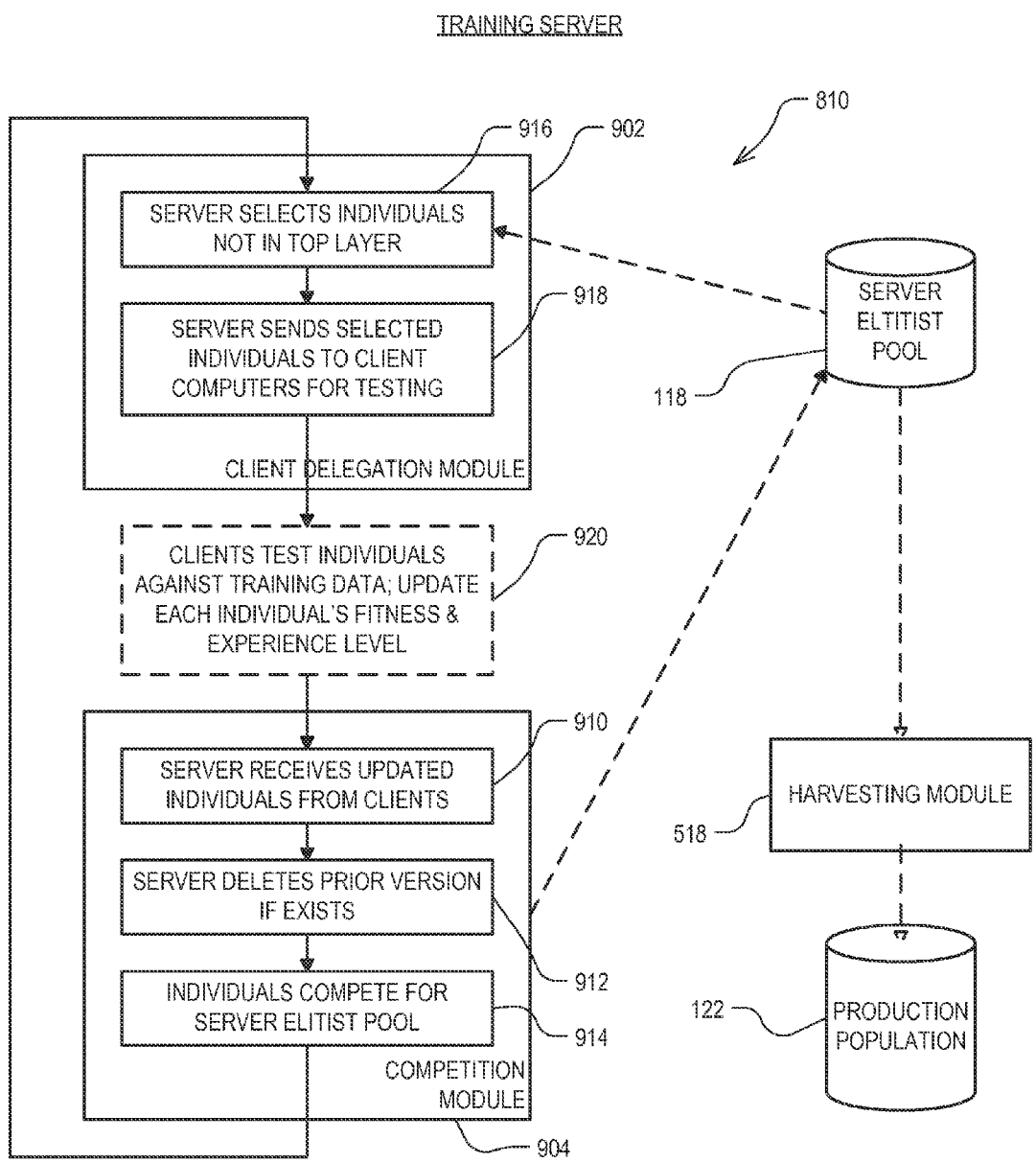
FIG. 9 illustrates modules that can be used to implement the functionality of training server of FIG. 8.

FIG. 9 illustrates various modules that can be used to implement the functionality of training server 810 (FIG. 8). Elitist pool 118 and production population database 122 are also shown in the drawing. As in the embodiment of FIG. 5, solid lines in FIG. 9 indicate process flow, and broken lines indicate data flow. The implementation variations mentioned above with respect to the embodiment of FIG. 5 apply to FIG. 9 as well.

In the operation of the client/server model, the training server 810 does not perform any testing or procreation itself (though in another embodiment it does). It does, however, enforce competition within its own server-centric elitist pool 118 when individuals are returned from clients. FIG. 9 illustrates various modules that can be used to implement the functionality of training server 810. Like the embodiment of FIG. 5, the training server 810 includes a competition module 904. It also includes harvesting module 518, which may be same as in FIG. 5. It also includes candidate testing and procreation functionality, but these are combined into a single client delegation module 902 in FIG. 9. The client delegation module 902 and the competition module 904 constitute two sub-modules in a candidate pool processor module (not shown specifically in FIG. 9). The FIG. 9 embodiment does not include a pool initialization module in the sense of FIG. 5, since as mentioned, the clients initialize their own individual pools.

Referring to FIG. 9, in step 910, the competition module 904 receives individuals from one or more of the client computers 820. These individuals may arrive asynchronously, if and when client computers have them available to transmit. They may arrive out-of-order, and some individuals previously sent out for testing may never return. Individuals may arrive individually, or in bunches. At various times determined by competition module 904, after at least one individual has arrived, competition module 904 proceeds to step 912 to begin a competition "event".

In step 912, competition module 904 determines whether each incoming individual is a new one, or a return of an individual that the server previously sent out for testing. This determination can be made on the basis of individual IDs 312 (FIG. 3). If the latter, then the training server 810 replaces its prior copy of the individual with the one newly received. This step may involve merely updating the experience level and the fitness estimation of the prior copy of the individual in the server-centric elitist pool 118. If in step 912, the competition module 904 determines that the incoming individual is a new one, then in step 914 the incoming individual competes for its position in the server elitist pool 118. The same rules of competition apply here as they do for the competition module 514 in the server-only model. That is, the fitness estimate of the incoming individual is compared to the least fit individual in the now-appropriate experience layer for the incoming individual, and only the fitter of the two is retained. The other is discarded. An elitist pool minimum fitness policy can be applied here as well, based on a server-centric minimum fitness level. Alternatively, the entire server elitist pool 118 can be disbanded and reconstituted at each competition event, as described in more detail with respect to FIG. 6.

In the client delegation module 902, in step 916, the server 810 selects individuals from the server-centric elitist pool 118, and sends them out to one or more clients 820 for further testing (step 918). As in the server-only embodiment, the client delegation module 902 is restricted from selecting for further testing individuals already in the top layer of the elitist pool 118. In one embodiment, the battery of trials that an individual is to undergo is dictated by the training server. In such an embodiment, the server-centric view of the battery is the same as the client-centric view of the battery. In another embodiment, the battery of trials that an individual is to undergo is left to the client to decide, and client may perform more than one battery of trials on the individual before returning it to the server. In the latter embodiment, the client has its own client-centric view of a testing battery, and the server-centric view of the battery is unimportant.

In step 920 the client machines 820 test the individuals against training data from the data feed server 830, and update each individual's fitness and experience level locally. Step 920 is shown in broken lines in FIG. 9 because it is performed by clients rather than training server 810. At various subsequent times, the server 810 again receives back updated individuals from the clients in step 910, and repeats the process of FIG. 9.

The operation of the client computers 820 is the same as that previously described with respect to FIGS. 5 and 6, with the exception that individuals are provided both by the pool initialization module 510, as well as from the training server 810. The candidate pool 116 in a client computer 820 is client-centric, and includes all candidate individuals being considered by the clients, including those that do not yet have sufficient experience to be considered for the elitist pool in the client computer. The candidate pool in the clients are layer-oriented as shown in FIG. 2, and for convenience, the layers in a client computer are sometimes designated herein with a top layer numbered CT rather than T, and with layers designated $CL_0$-$CL_{CT}$. None of the layer parameters in the client-centric candidate pool, including the number of layers, need be the same as their corresponding parameters in other clients or in the server. Preferably the candidate pool 116 in the client computers 820 are implemented using linked lists, whereas the elitist pool 118 in the server 810 are implemented using a DBMS, both as previously described.

Unlike the single server embodiment, the candidate testing module in the client computer 820 does not prevent further testing of individuals that have reached the top layer $CL_{CT}$ of the client-centric elitist pool 820. The harvesting module in a client computer 820 selects individuals only from the top layer $CL_{CT}$ of the client computer 820 for transmitting back to the server 810. Since the server 810 does not maintain any individuals that do not qualify for the server-centric elitist pool 118, the minimum experience level of the top layer $CL_{CT}$ in the client-centric elitist pool on each client computer 820 must be at least as high as the minimum experience level of the lowest layer $L_1$ of the elitist pool 118 of the training server 810. Preferably the minimum experience level of the top layer $CL_{CT}$ in the client-centric elitist pool on each client computer 820 is equal to the minimum experience level of the lowest layer $L_1$ of the elitist pool 118 of the training server 810.

Note that because of procreation on the client system 820, individuals may be sent up to the training server 810 which the training server 810 had never before seen. Such individuals are handled in step 914 (FIG. 9), by requiring them to compete for their position in the server-centric elitist pool 118 of the training server 810. Note further that because of competition in the client computer 820, some individuals that the training server 810 sent to the client computer 820 for further testing will never be returned to the training server 810. In this case the prior copy of the individual, retained by the training server 810, remains in place in the elitist pool 118 of the training server 810 unless and until it is displaced through competition in the training server 810 (step 914). Still further, note that an individual retained in the training server 810 after it has also been sent to a client 820 for further testing, may become displaced and deleted from the elitist pool 118 in the training server 810 through competition in the training server 810 (step 914). In this case, if the same individual is returned by the client computer 820, the training server 810 simply ignores it.

As used herein, a given event or value is "responsive" to a predecessor event or value if the predecessor event or value influenced the given event or value. If there is an intervening processing element, step or time period, the given event or value can still be "responsive" to the predecessor event or value. If the intervening processing element or step combines more than one event or value, the signal output of the processing element or step is considered "responsive" to each of the event or value inputs. If the given event or value is the same as the predecessor event or value, this is merely a degenerate case in which the given event or value is still considered to be "responsive" to the predecessor event or value. "Dependency" of a given event or value upon another event or value is defined similarly.

Applicants hereby disclose in isolation each individual feature described herein and each combination of two or more such features, to the extent that such features or combinations are capable of being carried out based on the present specification as a whole in light of the common general knowledge of a person skilled in the art, irrespective of whether such features or combinations of features solve any problems disclosed herein, and without limitation to the scope of the claims. Applicants indicate that aspects of the present invention may consist of any such feature or combination of features. In view of the foregoing description it will be evident to a person skilled in the art that various modifications may be made within the scope of the invention.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. For example, whereas aspects described herein are applied to experience layered training systems, experience layering is not required to achieve benefits of the invention. Nor is there any requirement that training always involve comparing individuals only with those of similar testing experience levels. Nor is it are aspects of the invention be limited to applications in which fitness of an individual is only estimated; embodiments in which fitness of an individual can be determined exactly can benefit from aspects of the invention as well.

Nor is tick data the only kind of data on which a system according to the invention can be operated. Tick data is an example of an ordered sequence of data in a sample. This may be intuitive for tick data, where ticks naturally represent a time sequence of data. But data in other environments, for example non-financial, can be assigned an ordered sequence as well. The candidate testing module 520 and the production system 112 apply the rules in the candidate or production population to the sample data in the ordered sequence of the data in the sample.

Furthermore, aspects of the invention can be applied with other types of evolutionary algorithms other than genetic algorithms.

Many other variations will be apparent. In particular, and without limitation, any and all variations described, suggested or incorporated by reference in the Background section or the Cross References section of this patent application are specifically incorporated by reference into the description herein of embodiments of the invention. In addition, any and all variations described, suggested or incorporated by reference herein with respect to any one embodiment are also to be considered taught with respect to all other embodiments. The embodiments described herein were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

The invention claimed is:

1. A computer-implemented data mining system, for use with a data mining training database containing training data, comprising:
    a memory storing a candidate database having a pool of candidate individuals, each candidate individual identifying a respective set of at least two rules including an entering rule and an exiting rule, the entering rule identifying both a label to assert in dependence upon the training data and a position entering action to assert in dependence upon the training data, and the exiting rule identifying both a label to assert in dependence upon the training data and a position exiting action to assert in dependence upon the training data, each candidate individual further having associated therewith an indication of a respective fitness estimate; and
    a candidate pool processor which:
        tests individuals from the candidate pool on the training data, each individual being tested undergoing a respective battery of at least one trial, each trial applying the rules of the respective individual to the training data, each rule that asserts its action in response to the training data also asserting its label in response to the training data;
        updates the fitness estimate associated with each of the individuals being tested in dependence upon both the training data and the actions and labels asserted by the rules in the respective individual in the battery of trials; and
        selects individuals for discarding from the candidate pool in dependence upon predetermined criteria.

2. The system of claim 1, wherein in updating the fitness estimate associated with each of the individuals, the system, in response to activation of a first exiting rule which asserts a first exiting action and a corresponding first label, the individual having the first exiting rule having associated therewith a first status record, to the extent that the first status record has a position matching the first exiting action and the first label:
    updates the first status record associated with the individual having the first exiting rule to reflect the first exiting action; and
    updates the fitness estimate of the individual having the first exiting rule in dependence upon the extent that the first status record has a position matching the first exiting action and the first label.

3. The system of claim 2, wherein in updating the fitness estimate associated with each of the individuals, the system, in response to activation of a second entering rule which asserts a second entering action and a corresponding second label, updates a second status record associated with the individual having the second entering rule to reflect the second entering action in association with the second label.

4. The system of claim 3, wherein the individual having the second entering rule is the same as the individual having the first exiting rule, and wherein the second status record is the same as the first status record.

5. The system of claim 1, wherein in updating the fitness estimate associated with each of the individuals, the system, in response to activation of a second entering rule which asserts a second entering action and a corresponding second label, updates a second status record associated with the individual having the second entering rule to reflect the second entering action in association with the second label.

6. The system of claim 1, wherein the exiting rule in a first one of the individuals identifies a set of at least one condition upon which assertion of the exiting rule depends,
    and wherein a first one of the conditions identifies a first label.

7. The system of claim 6, wherein the label identified for assertion by the entering rule of the first individual matches the first label.

8. The system of claim 6, wherein the first condition precludes assertion of the action of the exiting rule unless a status record of the first individual has a position associated with the first label, that satisfies the first condition.

9. The system of claim 1, wherein the candidate pool processor further includes a procreation module which forms new individuals in dependence upon a respective set of at least one parent individual from the candidate pool, at least in part by copying into each subject new individual at least one item selected by the candidate pool processor from an available group of items, the available group of items including a label identified for assertion in a rule of an individual in the set of parent individuals corresponding to the subject new individual.

10. The system of claim 1, wherein each given one of the rules identifies a set of at least one condition upon which activation of the given rule depends, and wherein the candidate pool processor further includes a procreation module which forms new individuals in dependence upon a respective set of at least one parent individual from the candidate pool, at least in part by copying into each subject new individual at least one item selected by the candidate pool processor from an available group of items, the available group of items including a condition in a rule of an individual in the set of parent individuals corresponding to the subject new individual, wherein the condition identifies a label.

11. The system of claim 10, wherein the available group of items further includes:

a label identified for assertion in a rule of an individual in the set of parent individuals corresponding to the subject new individual;

a rule in an individual in the set of parent individuals corresponding to the subject new individual; and an action identified for assertion in a rule in an individual in the set of parent individuals corresponding to the subject new individual.

12. The system of claim 1, wherein in updating the fitness estimate associated with each given one of the individuals, the system activates at least one of the rules of the given individual which asserts its action.

13. The system of claim 1, wherein in updating the fitness estimate associated with each given one of the individuals, the system, for each application of the rules of the given individual to the training data, selects for activation no more than one of the rules of the given individual that assert their action.

14. The system of claim 13, wherein the rules of each of the individuals have an order from first to last, and wherein in selecting for activation no more than one of the rules of the given individual that assert their action, the system selects the lowest order one of the rules that asserts its action.

15. The system of claim 13, wherein each of the rules in each of the individuals further identifies a strength value, and wherein in selecting for activation no more than one of the rules of the given individual that assert their action, the system selects an asserted rule that identifies the highest strength value.

16. The system of claim 13, wherein all of the actions of all of the rules of all of the individuals in the candidate pool are restricted to a limited number of categories, and wherein in selecting for activation no more than one of the rules of the given individual that assert their action, the system:

determines a category containing the largest number of asserted rules; and selects an asserted rule whose action falls into that category.

17. The system of claim 1, wherein the system restricts all of the labels identified for assertion by all of the rules of all of the individuals in the candidate pool, to a limited number of different labels.

18. The system of claim 1, wherein the system restricts all of the labels identified for assertion by all of the rules of all of the individuals in the candidate pool, to no more than five different labels.

19. The computer-implemented data mining system of claim 1, further comprising a harvesting module providing for deployment selected ones of the individuals from the candidate pool.

20. The computer-implemented data mining system of claim 1, wherein the predetermined criteria comprises the selected individual's updated fitness estimate.

21. A computer-implemented data mining system, for use with a data mining training database containing training data, comprising:

a data processor; and a storage subsystem coupled to the data processor and having stored therein in a non-transitory manner a candidate database having a plurality of candidate individuals, each candidate individual identifying a respective set of at least two rules including an entering rule and an exiting rule, the entering rule identifying both a label to assert in dependence upon the training data and a position entering action to assert in dependence upon the training data, and the exiting rule identifying both a label to assert in dependence upon the training data and a position exiting action to assert in dependence upon the training data, each candidate individual further having associated therewith an indication of a respective fitness estimate.

22. The system of claim 21, wherein the storage subsystem further has stored therein in a non-transitory manner a status record corresponding to each of the candidate individuals, each of the status records indicating all positions of the corresponding candidate individual resulting from prior activation of entering and exiting rules of the corresponding candidate individual, the status records also indicating a label for at least each non-zero position.

23. The system of claim 21, wherein a particular one of the rules in a particular one of the candidate individuals identifies a set of at least one condition upon which assertion of the particular rule depends, and wherein a particular one of the conditions identifies a particular label.

24. The system of claim 23, wherein the label identified for assertion by the entering rule of the particular individual matches the particular label.

25. The system of claim 23, wherein the particular condition precludes assertion of the action of the particular rule unless a status record of the particular individual has a position associated with the particular label, that satisfies the condition.

26. A computer-implemented system, for use with an ordered sequence of input data, comprising:

a processor; and a storage subsystem coupled to the processor and having stored therein in a non-transitory manner a pool of at least one individual, each individual identifying a respective set of at least two rules including an entering rule and an exiting rule, the entering rule identifying both a label to assert in dependence upon the input data and a position entering action to assert in dependence upon the input data, and the exiting rule identifying both a label to assert in dependence upon the input data and a position exiting action to assert in dependence upon the input data, each individual further having a status record associated therewith, wherein the processor, for each given individual in the pool:
applies the rules of the given individual to the input data, each rule that asserts its action in response to the input data also asserting its label in response to the input data; and
in response to activation of a given rule that asserts its action:
outputs a signal toward a controlled system in dependence upon the action of the given rule, and
updates a status record associated with the given individual in dependence upon both the action of the given rule and the label of the given rule.

27. The system of claim 26, wherein the processor, in updating the status record of the given individual in response to activation of an entering rule which asserts a first entering action and a corresponding first label, updates the status record of the given individual to reflect both an increase in a position identified by the first entering action and an association of either the increase or the position or both with the first label.

28. The system of claim 27, wherein the processor, in updating the status record of the given individual in response to activation of an exiting rule which asserts a second exiting action and a corresponding second label, updates the status record of the given individual only to the extent that the status record of the given individual has a position matching the second exiting action and the second label.

29. The system of claim 28, wherein the processor, in outputting a signal toward a controlled system in response to activation of the second exiting rule, limits any exiting order in the signal, to the extent that the status record of the given individual has a position matching the second exiting action and the second label.

30. The system of claim 26, wherein the processor, in updating the status record of the given individual in response to activation of an exiting rule which asserts a second exiting action and a corresponding second label, updates the status record of the given individual only to the extent that the status record of the given individual has a position matching the second exiting action and the second label.

31. The system of claim 26, wherein a particular one of the rules of the given individual identifies a set of at least one condition upon which assertion of the particular rule depends,
and wherein a first one of the conditions identifies particular label.

32. The system of claim 31, wherein the label identified for assertion by the entering rule of the first individual matches the particular label.

33. The system of claim 31, wherein the particular condition precludes assertion of the action of the particular rule unless the status record of the given individual has a position associated with the particular label, that satisfies the particular condition.

34. The system of claim 26, wherein the processor, in applying the rules of the given individual to the input data, activates at least one of the rules of the given individual which asserts its action.

35. A method for data mining, for use with a data mining training database containing training data, comprising:
storing in a memory, a candidate database having a pool of candidate individuals, each candidate individual identifying a respective set of at least two rules including an entering rule and an exiting rule, the entering rule identifying both a label to assert in dependence upon the training data and a position entering action to assert in dependence upon the training data, and the exiting rule identifying both a label to assert in dependence upon the training data and a position exiting action to assert in dependence upon the training data, each candidate individual further having associated therewith an indication of a respective fitness estimate;
a candidate pool processor testing individuals from the candidate pool on the training data, each individual being tested undergoing a respective battery of at least one trial, each trial applying the rules of the respective individual to the training data, each rule that asserts its action in response to the training data also asserting its label in response to the training data;
the candidate pool processor updating the fitness estimate associated with each of the individuals being tested in dependence upon both the training data and the actions and labels asserted by the rules in the respective individual in the battery of trials; and
the candidate pool processor selecting individuals for discarding from the candidate pool in dependence upon predefined criteria.

36. The method for data mining of claim 35, further comprising providing by a harvesting module deployment of selected ones of the individuals from the candidate pool.

37. The method for data mining of claim 35, wherein the predetermined criteria comprises the selected individual's updated fitness estimate.

38. A method for data mining, for use with a data mining training database containing training data, comprising:
storing in a non-transitory manner in a storage subsystem coupled to a data processor, a candidate database having a plurality of candidate individuals, each candidate individual identifying a respective set of at least two rules including an entering rule and an exiting rule, the entering rule identifying both a label to assert in dependence upon the training data and a position entering action to assert in dependence upon the training data, and the exiting rule identifying both a label to assert in dependence upon the training data and a position exiting action to assert in dependence upon the training data, each candidate individual further having associated therewith an indication of a respective fitness estimate.

39. A method for processing an ordered sequence of input data, comprising:
storing in a non-transitory manner in a storage subsystem coupled to a data processor, a pool of at least one individual, each individual identifying a respective set of at least two rules including an entering rule and an exiting rule, the entering rule identifying both a label to assert in dependence upon the input data and a position entering action to assert in dependence upon the input data, and the exiting rule identifying both a label to assert in dependence upon the input data and a position exiting action to assert in dependence upon the input data, each individual further having a status record associated therewith; and
for each given individual in the pool:
applying the rules of the given individual to the input data, each rule that asserts its action in response to the input data also asserting its label in response to the input data, and
in response to activation of a given rule that asserts its action:
outputting a signal toward a controlled system in dependence upon the action of the given rule; and updating a status record associated with the given individual in dependence upon both the action of the given rule and the label of the given rule.

40. A computer-readable medium for implementing a data mining system and for use with a data mining training database containing training data, the medium having stored thereon in a non-transitory manner a candidate database having a pool of candidate individuals, each candidate individual identifying a respective set of at least two rules including an entering rule and an exiting rule, the entering rule identifying both a label to assert in dependence upon the training data and a position entering action to assert in dependence upon the training data, and the exiting rule identifying both a label to assert in dependence upon the training data and a position exiting action to assert in dependence upon the training data, each candidate individual further having associated therewith an indication of a respective fitness estimate;

the medium further having stored thereon in a non-transitory manner a plurality of software code portions which define logic for implementing a candidate pool processor which:

tests individuals from the candidate pool on the training data, each individual being tested undergoing a respective battery of at least one trial, each trial applying the rules of the respective individual to the training data, each rule that asserts its action in response to the training data also asserting its label in response to the training data, updates the fitness estimate associated with each of the individuals being tested in dependence upon both the training data and the actions and labels asserted by the rules in the respective individual in the battery of trials, and selects individuals for discarding from the candidate pool in dependence upon predetermined criteria.

41. The computer-readable medium of claim 40, the medium further having stored thereon in a non-transitory manner a plurality of software code portions which define logic for implementing a harvesting module providing for deployment selected ones of the individuals from the candidate pool.

42. The computer-readable medium of claim 40, wherein the predetermined criteria comprises the selected individual's updated fitness estimate.

43. A computer-readable medium for implementing a data mining system and for use with a data mining training database containing training data, the medium having stored therein in a non-transitory manner a candidate database having a plurality of candidate individuals, each candidate individual identifying a respective set of at least two rules including an entering rule and an exiting rule, the entering rule identifying both a label to assert in dependence upon the training data and a position entering action to assert in dependence upon the training data, and the exiting rule identifying both a label to assert in dependence upon the training data and a position exiting action to assert in dependence upon the training data, each candidate individual further having associated therewith an indication of a respective fitness estimate.

44. A computer readable medium, for use with an ordered sequence of input data, the medium having stored therein in a non-transitory manner a pool of at least one individual, each individual identifying a respective set of at least two rules including an entering rule and an exiting rule, the entering rule identifying both a label to assert in dependence upon the input data and a position entering action to assert in dependence upon the input data, and the exiting rule identifying both a label to assert in dependence upon the input data and a position exiting action to assert in dependence upon the input data, each individual further having a status record associated therewith, the medium further having stored thereon in a non-transitory manner a plurality of software code portions which define logic for, for each given individual in the pool:

applying the rules of the given individual to the input data, each rule that asserts its action in response to the input data also asserting its label in response to the input data; and in response to activation of a given rule that asserts its action:

outputting a signal toward a controlled system in dependence upon the action of the given rule, and updating a status record associated with the given individual in dependence upon both the action of the given rule and the label of the given rule.

45. A computer-implemented data mining system, for use with a data mining training database containing training data, comprising:

storage means for storing a candidate database having a pool of candidate individuals, each candidate individual identifying a respective set of at least two rules including an entering rule and an exiting rule, the entering rule identifying both a label to assert in dependence upon the training data and a position entering action to assert in dependence upon the training data, and the exiting rule identifying both a label to assert in dependence upon the training data and a position exiting action to assert in dependence upon the training data, each candidate individual further having associated therewith an indication of a respective fitness estimate; and candidate pool processor means for:

testing individuals from the candidate pool on the training data, each individual being tested undergoing a respective battery of at least one trial, each trial applying the rules of the respective individual to the training data, each rule that asserts its action in response to the training data also asserting its label in response to the training data;

updating the fitness estimate associated with each of the individuals being tested in dependence upon both the training data and the actions and labels asserted by the rules in the respective individual in the battery of trials; and selecting individuals for discarding from the candidate pool in dependence upon their updated fitness estimate.

46. A computer-implemented data mining system, for use with a data mining training database containing training data, comprising:

storage means for storing in a non-transitory manner a candidate database having a plurality of candidate individuals, each candidate individual identifying a respective set of at least two rules including an entering rule and an exiting rule, the entering rule identifying both a label to assert in dependence upon the training data and a position entering action to assert in dependence upon the training data, and the exiting rule identifying both a label to assert in dependence upon the training data and a position exiting action to assert in dependence upon the training data, each candidate individual further having associated therewith an indication of a respective fitness estimate.

47. A computer-implemented data mining system, for use with an ordered sequence of input data, comprising:

storage means for storing in a non-transitory manner a pool of at least one individual, each individual identifying a respective set of at least two rules including an entering rule and an exiting rule, the entering rule identifying both a label to assert in dependence upon the input data and a position entering action to assert in dependence upon the input data, and the exiting rule identifying both a label to assert in dependence upon the input data and a position exiting action to assert in dependence upon the input data, each individual further having a status record associated therewith, and processing means for, for each given individual in the pool:

applying the rules of the given individual to the input data, each rule that asserts its action in response to the input data also asserting its label in response to the input data; and in response to activation of a given rule that asserts its action:

outputting a signal toward a controlled system in dependence upon the action of the given rule, and updating a status record associated with the given individual in dependence upon both the action of the given rule and the label of the given rule.

\* \* \* \* \*